Feb. 18, 1941.　　M. L. STRAWN ET AL　　2,231,964
METHOD AND MACHINE FOR METALWORKING
Filed Feb. 24, 1937　　9 Sheets-Sheet 1

INVENTORS
Marion L. Strawn
Alexander Oberhoffken
By Parker, Carlson, Pitzner & Hubbard
ATTORNEYS

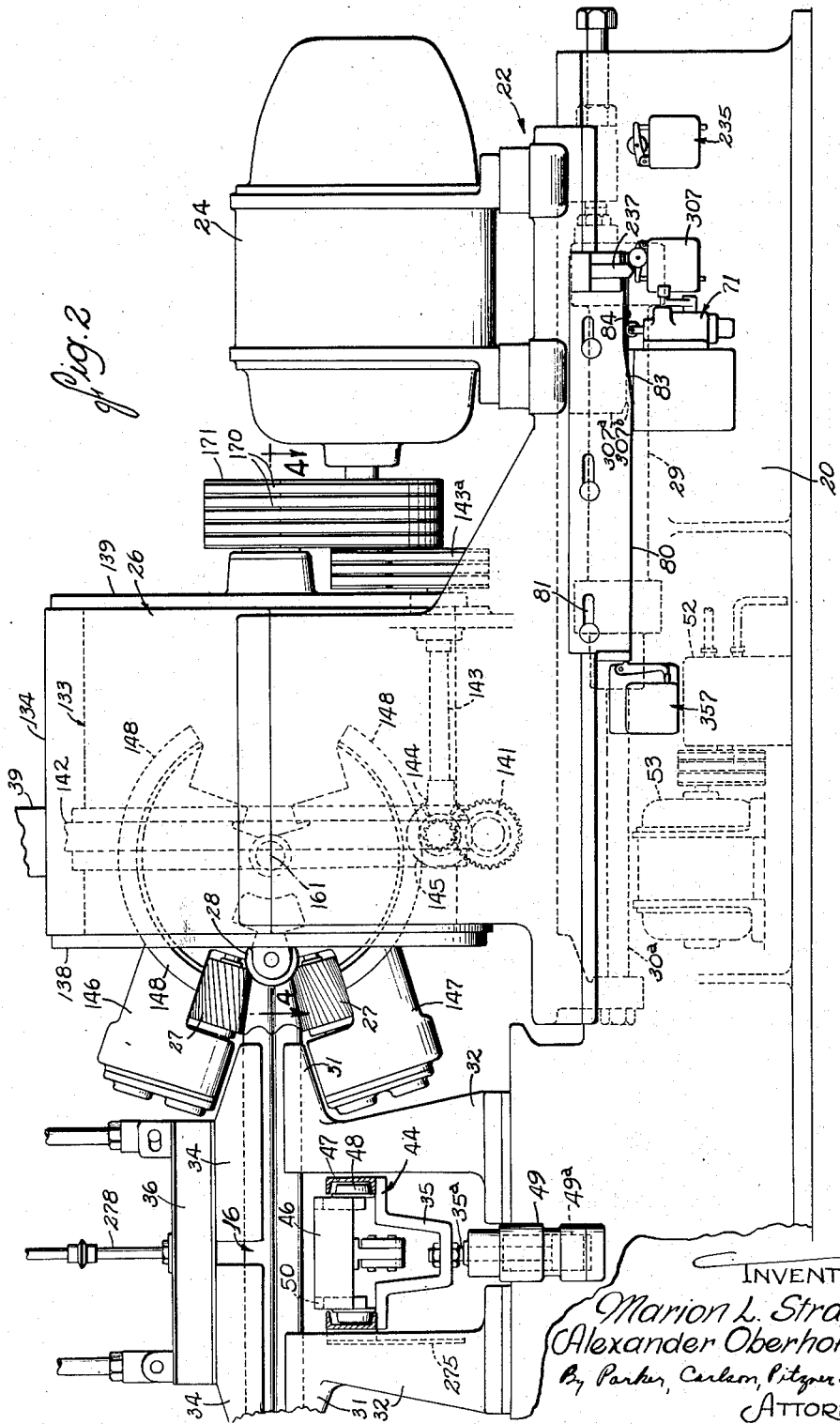

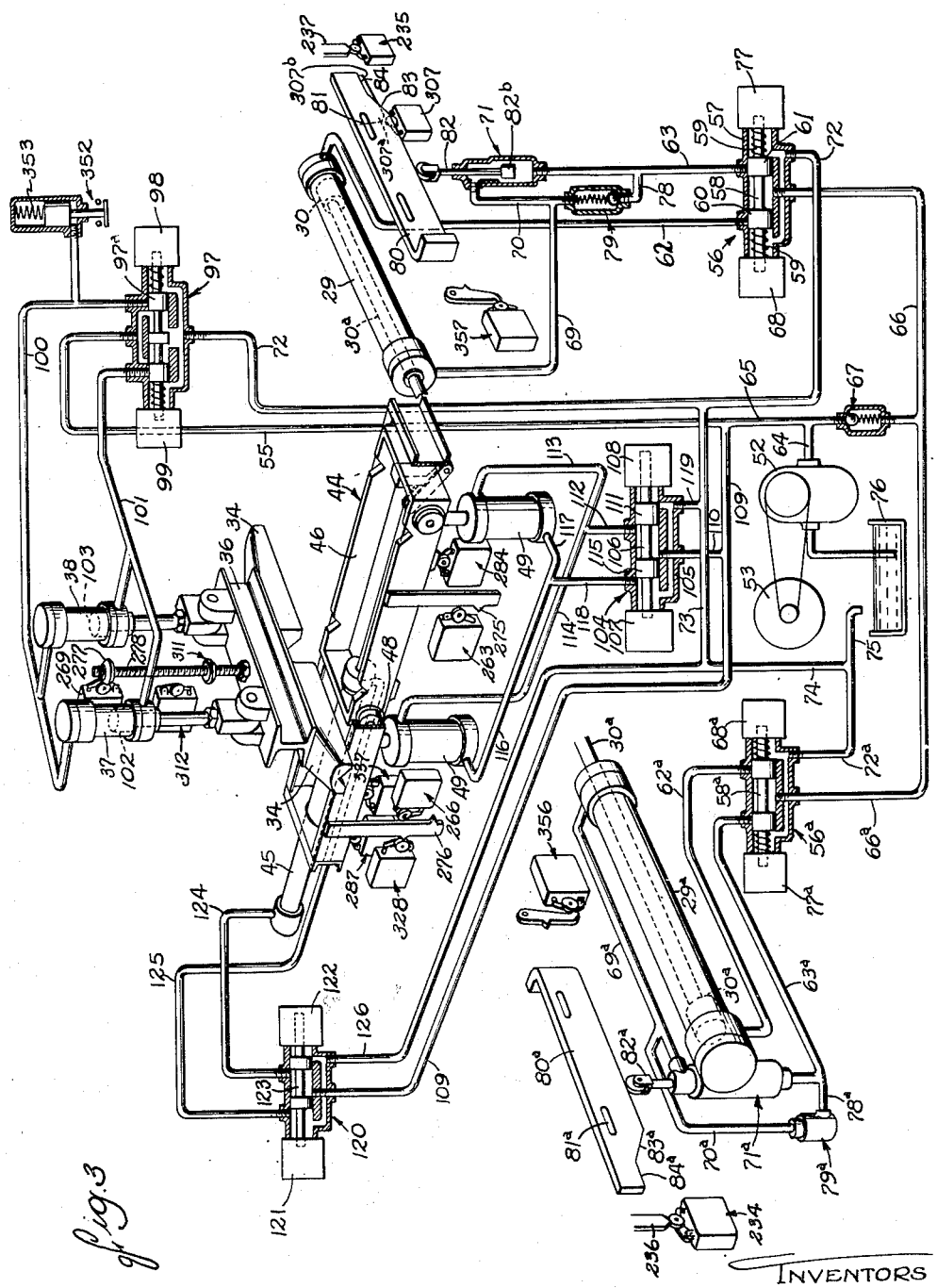

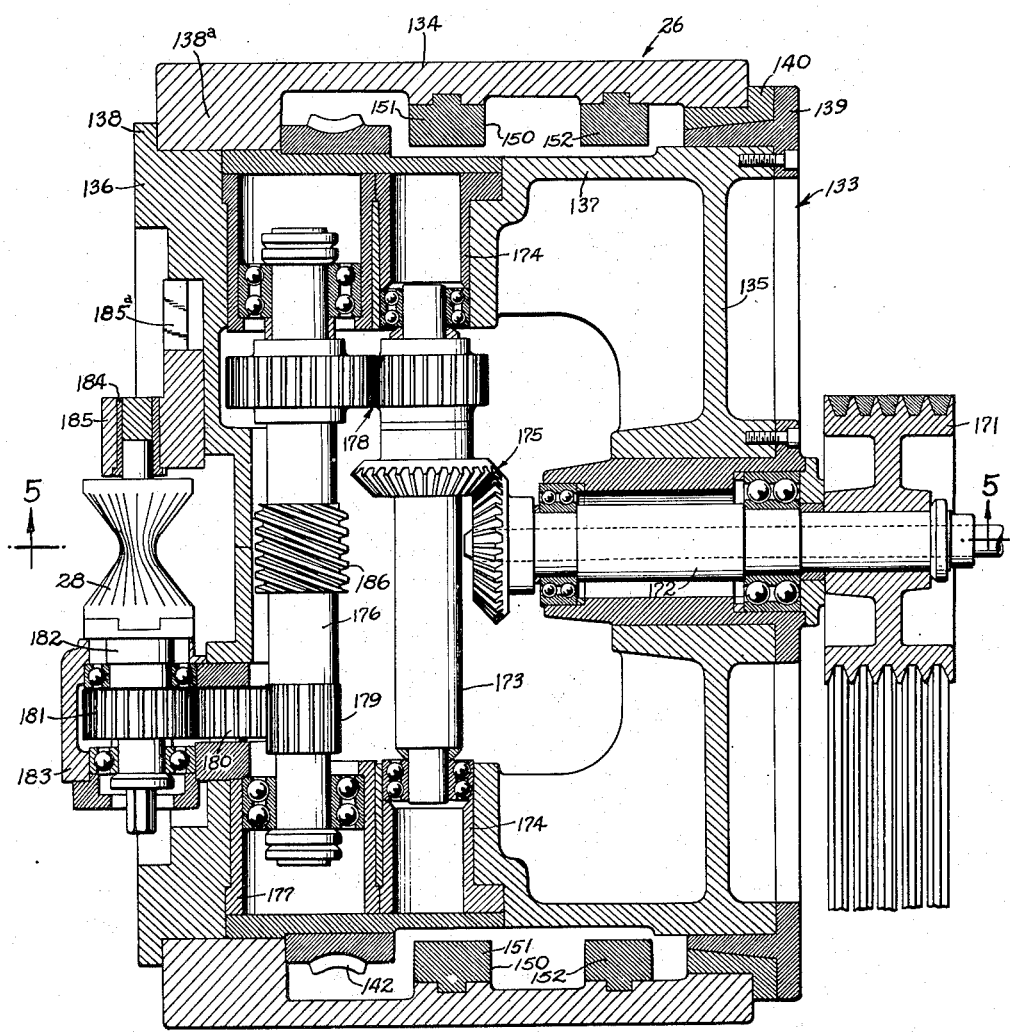

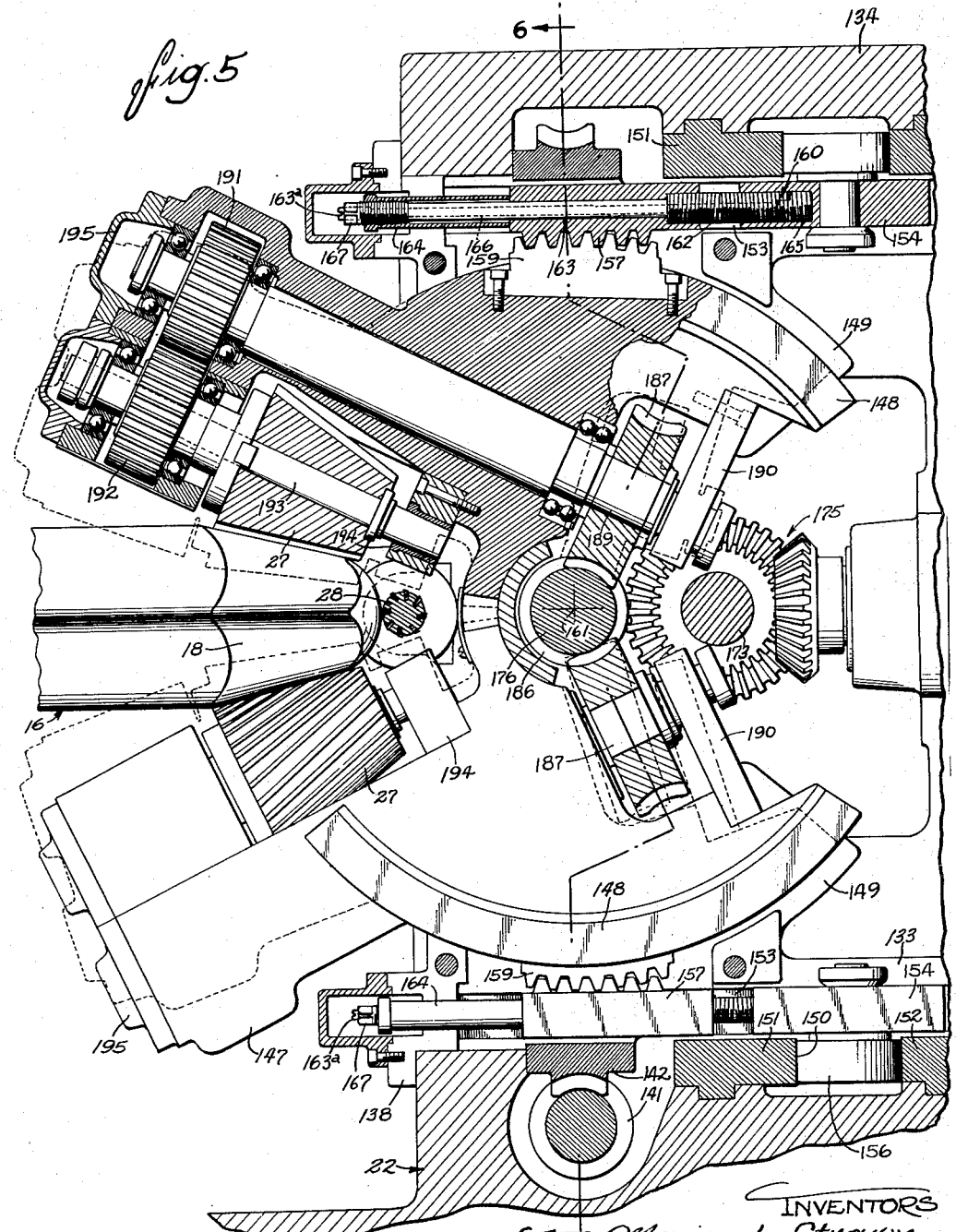

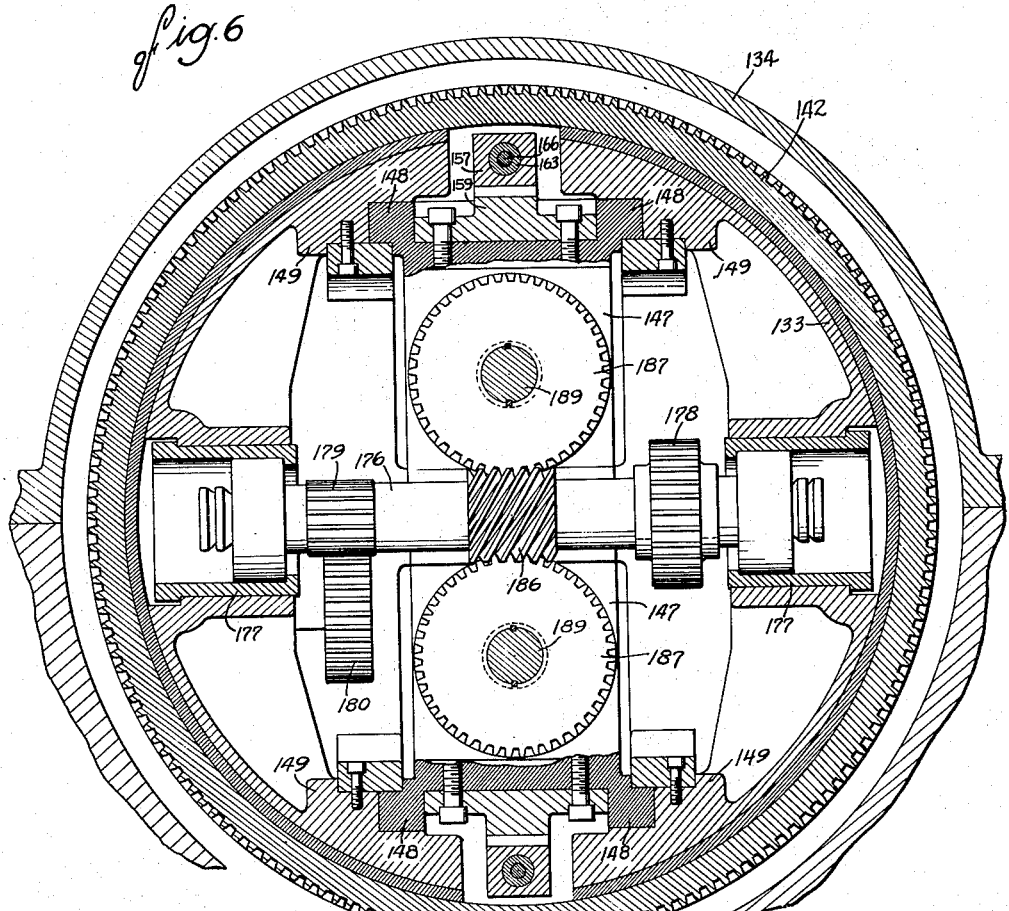

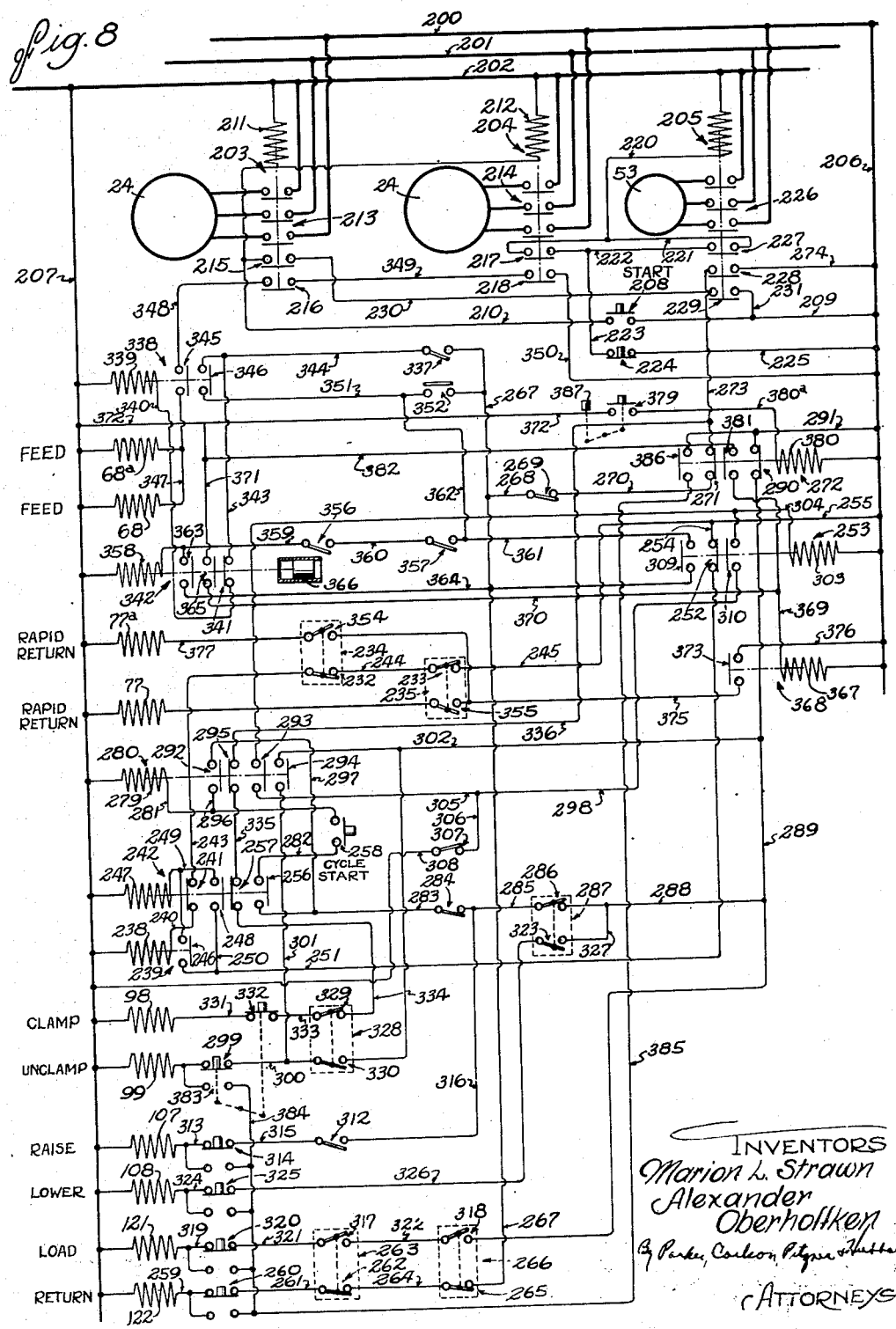

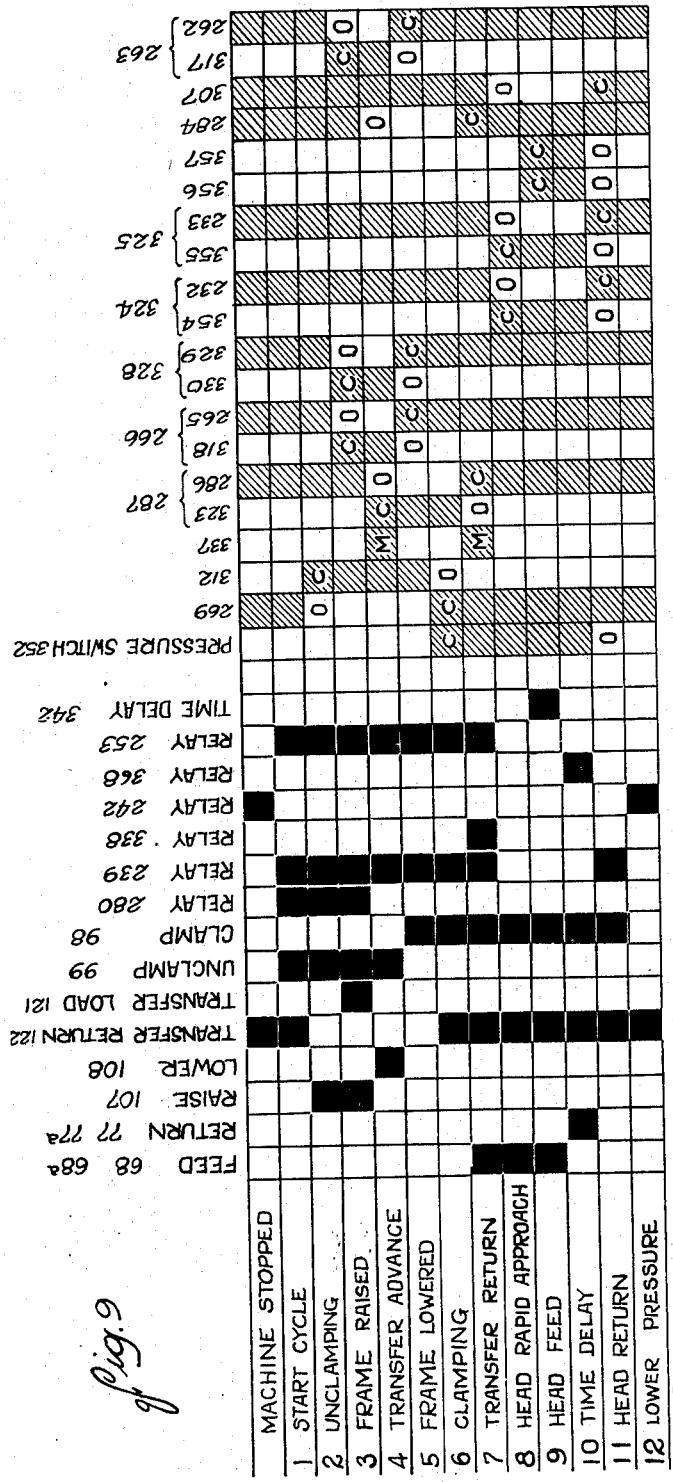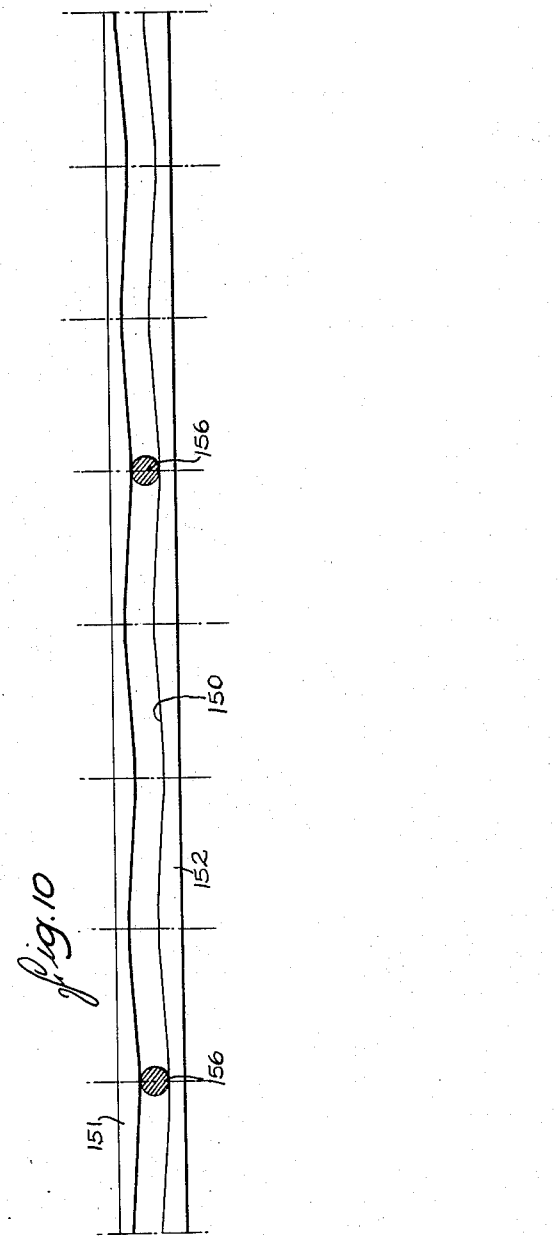

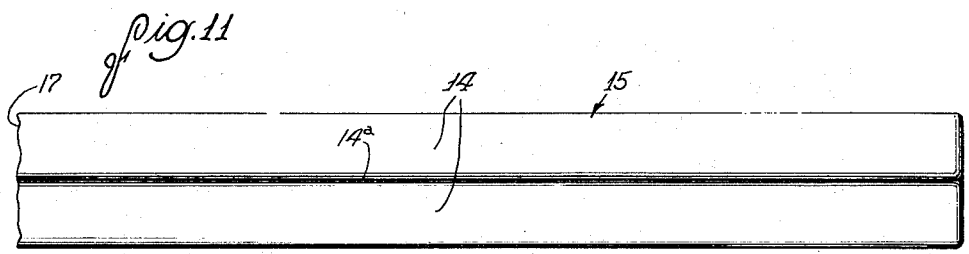
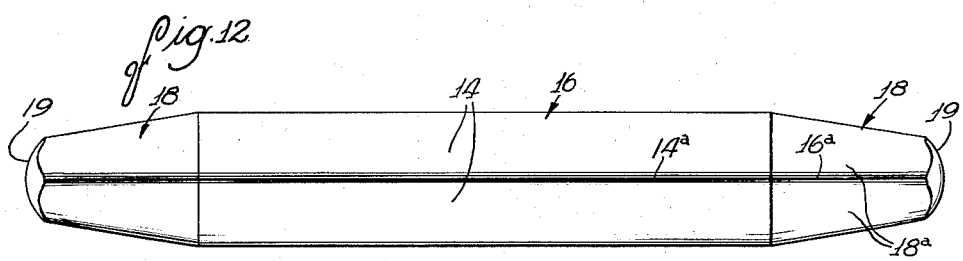
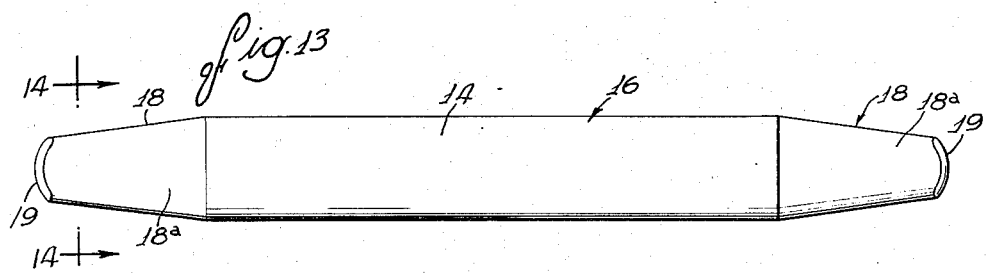
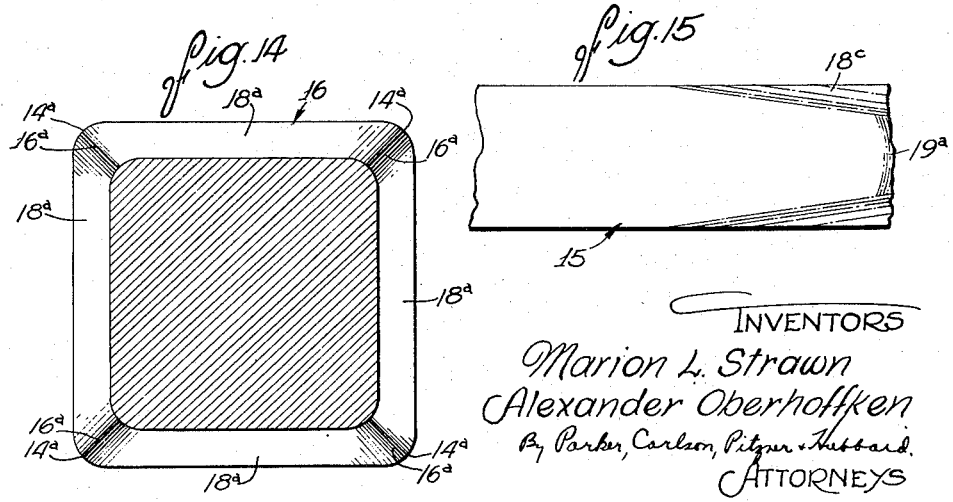
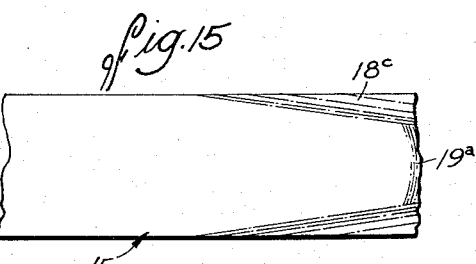

Patented Feb. 18, 1941

2,231,964

UNITED STATES PATENT OFFICE 2,231,964

METHOD AND MACHINE FOR METAL-WORKING

Marion L. Strawn and Alexander Oberhoffken, Rockford, Ill., assignors to The Ingersoll Milling Machine Company, Rockford, Ill., a corporation of Illinois Application February 24, 1937, Serial No. 127,446

39 Claims. (Cl. 90—11)

In certain of its aspects, the invention is concerned with general purpose machine tools. More specifically the invention relates to the working of metal bars or billets to prepare the same for rolling or wire drawing.

Billets such as are used in drawing wire are frequently cast in vertical molds. To prepare such billets for rolling, the practice has been to cut off the slag oxidized metal or so-called cold shots from the ends of the billet and swage the ends into a tapered shape suitable for rolling. Such mechanical working of the metal creates fractures so that the wire formed therefrom is apt to be substantially weaker or to contain imperfections. To overcome this difficulty, it has been proposed to taper the end of the billets by metal-removing operations and to shape the end for proper entry between the rolls and to prevent fish-tailing or splitting of the trailing end upon leaving the rolls by which the billet section is reduced.

A general object of the present invention is to provide a novel method of removing metal from bars to taper the ends thereof at a low unit cost.

A more detailed object is to provide a novel metal-removing method and machine for preparing vertically cast wire bars by tapering the bars, removing any impure metal therein, and shaping of the finished end, all in a single machining operation.

Another object is to provide a novel method and machine by which the end of a metal bar may be fashioned in a single metal-removing operation into the shape of a truncated pyramid having beveled or rounded edges.

The invention also resides in the novel arrangement of the cutting tools and manner of actuating the same to form a tapered end of the above character.

A further object is to provide, in a general purpose machine tool, a novel mechanism for handling the work pieces and presenting the same to and removing the same from a metal-removing or operating station.

Still another object is to provide a novel auxiliary control for machine tools which operate in multi-part automatic cycles, which control enables various power actuated mechanisms to be controlled under emergency or abnormal conditions conveniently and with safety to the operator and the machine parts.

A further object is to provide for control of the tool-feeding action in a novel manner such as to maintain approximately uniform load conditions during active engagement of the tools with the work.

Other objects and advantages of the invention will become apparent from the following detailed description taken in connection with the accompanying drawings, in which Figure 1 is a perspective view of a machine tool embodying the invention.

Fig. 1ª is an elevational view of the panel from which the machine is controlled.

Fig. 2 is a fragmentary side elevation of the machine shown in Fig. 1.

Fig. 3 is a schematic view of the principal moving parts, the hydraulic actuators therefor and the hydraulic control circuits.

Fig. 4 is a plan sectional view along the line 4—4 in Fig. 2.

Fig. 5 is a vertical sectional view taken substantially along the line 5—5 of Fig. 4.

Fig. 6 is a section taken along the line 6—6 of Fig. 5.

Fig. 7 is a diagrammatic view illustrating the paths of movement of the cutting tools.

Fig. 8 is a wiring diagram of the control and energizing circuits.

Fig. 9 is a program chart illustrating the cycle of operation.

Fig. 10 is a development of a cam by which the finished profile on a work piece is controlled.

Fig. 11 is an elevational view of a work piece of the type adapted to be operated upon by the machine shown in Fig. 1.

Figs. 12 and 13 are edge and face elevational views of a completed work piece.

Fig. 14 is an enlarged transverse sectional view along the line 14—14 in Fig. 13.

Fig. 15 is a fragmentary longitudinal sectional view of the rough work piece illustrating the manner in which metal is removed from one end.

Figures 1, 1A:
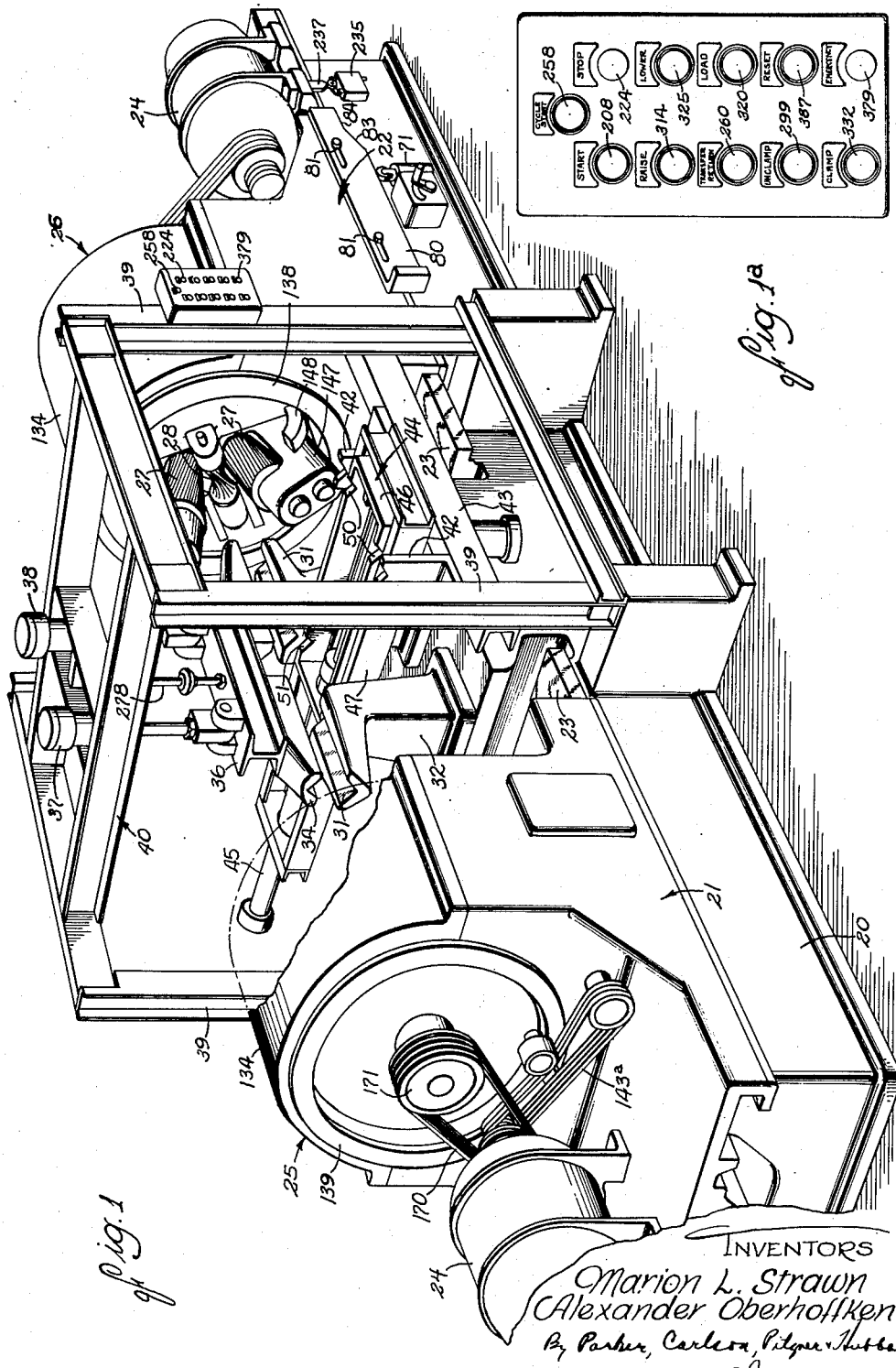

In many of its aspects, the invention is of general utility in the machine tool art. For purposes of illustration, however, we have shown in the drawings and will herein describe the invention as applied to the fashioning of a so-called vertically cast billet 15 (Fig. 11) of copper or the like preparatory to rolling or wire-drawing. It is to be understood that we do not intend to limit the invention by such disclosure but aim to cover all modifications and alternative methods falling within the spirit and scope of the invention as expressed in the appended claims.

Rough billets of the character above referred to are of generally rectangular cross-section with flat cast side faces 14 and beveled or rounded edges 14ª. At one end 17, such billets contain slag or other impurities and are of an irregular contour resulting from casting in a vertical or open top mold. The other end frequently contains so-called cold shots or prematurely chilled globules of metal. To prepare such billets for rolling or wire-drawing, it is desirable to remove the impure metal and taper the ends thereby reducing the billet to a finished form 16 illustrated in Figs. 12 and 13.

The tapered ends 18 of truncated pyramidal shape terminate bluntly in rounded end surfaces 19. The machined sides 18a of the pyramidal ends 18 are preferably formed as planar continuations of the sides 14 of the body portion in order to minimize the amount of metal which must be removed. The corners of the tapered ends are beveled or rounded as best shown at 16a in Fig. 11 so that there are no sharp edges that might result in the formation of cracks during rolling. By virtue of the convexly curved surface 19, the end of the billet will enter properly between the rolls and the trailing end will leave the rolls without danger of splitting or formation of a so-called fish tail.

The method in general

As applied to the machining of metal bars of the above character, the improved method contemplates fashioning of the ends 18 in metal-removing operations, preferably milling, which are effected during relative rotary and axial movements of the cutters and the billet about and along an axis extending longitudinally of the billet. In the present instance, the truncated pyramidal shape is formed in a continuous cutting operation which progresses in one or more spirals (see Fig. 7) around the end 17 so as to remove the metal from each side and edge in successive layers 18c (Fig. 15) extending parallel to the finished surface to be produced beginning at the outermost peripheral edge of the rough end. Beveling of the edges 14a and formation of the generally square cross-section on the end is effected by controllably varying the radial position of the milling tools in timed relation to the relative rotation between the work and tools, during each of the several revolutions required for each cycle of operation. The method also includes the step of removing a series of transverse layers 19a from the reduced end of the pyramid to form the convexly curved end surface 19 preferably during the latter part of the axial movement between the work and tool supports.

General machine construction

Referring particularly to Figs. 1 and 2, a novel and special type of machine has been illustrated which is particularly designed for forming wire bars of the type described above. The particular machine illustrated is adapted to shape both ends of a wire bar or billet simultaneously, but it will be understood that it may of course be modified to operate on a single end of the work piece, if desired. The machine includes a bed 20 having a pair of carriages 21 and 22 mounted thereon and slidable along horizontal guideways 23. These carriages support tool heads designated generally by the numerals 25 and 26, each carrying a pair of milling cutters 27 and a third cutter 28. Each set of cutters is driven through appropriate transmission mechanism by an individual electric motor 24 on the tool carriage. The latter is moved back and forth by an individual hydraulic actuator including a cylinder 29 (Fig. 2) mounted on the bed and a piston 30 therein with its rod 30a connected to the forward end of the carriage.

While being operated upon, the rough billet is, in the present instance, supported stationarily between the two heads, the machining of each overhanging end to the desired shape being effected as the heads advance toward each other and axially of the billet and each set of cutters is rotated bodily about the billet axis through several revolutions.

Herein the work piece is supported while being milled by a pair of fixed upwardly facing jaws 31 rigidly mounted on the central portion of the machine bed 20 by pedestals 32. These jaws cooperate with a pair of downwardly facing movable jaws 34 to clamp a work piece, the opposed faces of the jaws being angular in shape to receive the square cross-sectional billet and locate the same in a predetermined angular position with respect to the mechanism by which the profiling movement of the cutters is controlled. The movable jaws are carried by a rail 36 which is reciprocated vertically by hydraulic actuating mechanism including hydraulic cylinders 37 and 38. This clamp actuating mechanism is carried by a heavy super-structure disposed above the bed 20 and including vertical columns 39 and a horizontal frame indicated generally at 40.

A power actuated transfer mechanism is provided for carrying the wire bars to be machined to the work support from loading position at one side of the machine from the work support to an unloading position on the opposite side of the machine. If desired, suitable conveyors (not shown) may be utilized to move the wire bars to the loading position and away from the unloading position. To load the machine, bars are deposited successively onto the upper ends of a pair of notched brackets 42 carried by a cross rail 43 at one side of the machine. A wire bar placed on the brackets 42 is transferred to and moved to the fixed jaws 31 by a horizontal transfer carriage 44 which is reciprocated transversely of the machine bed by a power actuating mechanism including an hydraulic cylinder 45. The carriage 44 includes a rectangular open frame 46 having wheels 48 (Fig. 2) adapted to roll along channel shaped side rails of a frame 47.

The frame 47 is supported through the medium of a bracket 35 (Fig. 2) rigid with the upper ends of the rods 35a of pistons 49a which slide in vertical cylinders 49. The frame 47 is thus guided for vertical movement. The pistons and cylinders constitute the mechanism for raising and lowering the frame 47 and therefore the work carriage 44. In the upward movement of the frame when the carriage is in retracted or loading position as shown in Fig. 1, a wire bar supported by the brackets 42 is received in notches 50 and lifted by the carriage from the brackets. The carriage is then moved transversely, to the left as viewed in Fig. 1, until the wire bar is in alinement with the fixed jaws 31. As the carriage frame is lowered, the bar is received in the fixed jaws 31 and, in view of the angular shape of the jaw notches, the deposited bar is located in a definite angular position, that is, with its diagonals disposed vertically and horizontally. The transfer carriage is then returned to loading position.

Notches 51 are formed at the opposite end of the carriage frame 46 so that in the first upward movement of the carriage, the previously machined wire bar on the fixed jaws 31 is lifted out of the jaw notches so that in the movement of the carriage to advance a new work piece to working position, the machined piece is moved to the left as viewed in Fig. 1 and thus positioned above a pair of brackets (not shown) similar to the brackets 42 onto which it is deposited when the conveyor is again lowered. In this position, the finished work piece may be unloaded from the machine.

*Hydraulic actuating and control mechanisms*

The actuators for the tool head carriages 21, the work transfer carriage 44 and the work clamping mechanism have all been illustrated as being of the hydraulic type, although it will be apparent to those skilled in the art that other types of power application may be utilized if desired. These various hydraulic actuators are preferably supplied with pressure fluid from a single pump 52 (Figs. 2 and 3) driven by an electric motor 53 and conveniently mounted within the bed 20. In general, the flow of pressure fluid to the various actuators is controlled by valves which preferably are electrically operated to effect complete automatic cyclic operation of the machine.

The flow of pressure fluid from the pump 52 to the cylinder 29 associated with the right hand tool carriage 22 is controlled by a fluid distribution valve designated generaly by the numeral 56. This valve includes a casing or body member 57 providing a chamber in which a valve element 58 reciprocates. A pair of compression springs 59 serve to center the valve element 58 so that the collars 60 and 61 normally close the open ends of the conduits 62 and 63 respectively. Pressure fluid passes from the pump 52 through conduits 64, 65 and 66 to the central portion of a valve body 57. A spring biased check valve 67 interposed in the conduit 65 insures the presence of fluid at a predetermined minimum pressure before any fluid is permitted to flow to the distribution valve 56.

Energization of a "feed" solenoid 68 moves the valve element 58 to the left as viewed in Fig. 3 so that the collar 60 uncovers the lower end of conduit 62, permitting pressure fluid to flow therethrough to the outer end of the piston 30 in cylinder 29. As a consequence, the carriage 22 is traversed toward the work piece. At the same time, the collar 61 on valve 58 uncovers the lower end of the conduit 63 while at the same time cutting off communication between the conduit 66 and 63. As a result, fluid is discharged from the inner end of cylinder 29 through conduits 69 and 70 and a rate valve 71, then through the conduit 63 and distribution valve 56 through conduits 72, 73 and 74 to a discharge conduit 75 through which it passes to a sump 76. Advance of the carriage is interrupted when the "feed" solenoid 68 is deenergized permitting the self-centering valve element 58 to return to neutral position.

Return movement of the carriage 22 is effected by energizing a "return" solenoid 77 which moves the valve element 58 to the right (as viewed in Fig. 3) so that the collar 61 uncovers the lower end of conduit 63 establishing communication between the same and the supply conduit 66. Pressure fluid thus flows through the conduit 63 around the rate valve 71 through a by-pass conduit 78 and check valve 79 and then through the conduit 69 to the inner end of the cylinder 29. At the same time, the collar 60 uncovers the lower end of the conduit 62 and connects the rear end of the cylinder to the drain pipe 72. Deenergization of the "return" solenoid 77 serves to permit the valve element to return to its normal central position thereby interrupting the carriage return.

An arrangement has been provided for varying the speed of the carriage 22 during active engagement of the cutters 27 with the work piece for the purpose of enabling the cutters to be fed at higher speed during the first part of their active engagement when the volume of metal being removed in a given increment of carriage movement is comparatively small due to the narrower width and smaller cross section of the chips being formed. In the machine illustrated, this arrangement includes a cam plate 80 secured to a side of the carriage 22 by adjustable bolt-and-slot connections 81. The stem 82 of the rate valve 71 follows the lower edge of the cam plate. When the follower engages the high part as shown in Fig. 3, fluid may pass freely through the valve so that the pressure on the inner side of the piston 30 is quickly relieved and the carriage may approach the work at a rapid rate. As the follower encounters the inclined portion 83 of the cam, the valve element 82$^b$ is gradually moved toward its closed position thereby correspondingly throttling the rate of discharge of fluid from the cylinder and progressively slowing down the carriage. Preferably, the shape of the cam surface 83 is such as to reduce the feed rate in proportion to the increase in the width of the chips being formed so that the cutters are loaded substantially uniformly during active cutting engagement with the work. The adjustable mounting of the plate 80 makes it possible to effect this change at any selected point in the advance of the carriage.

When the stem 82 encounters the flat portion 84 of the cam 80, the rate valve is nearly closed so that the table is fed at a relatively slow feed rate during the final portion of its movement. It will be noted that the rapid return movement of the carriage 22 is unaffected by the rate valve 71 in view of the by-pass conduit 78 so that this return movement is made at a relatively constant rapid return rate.

The left hand tool carriage 21 is actuated and its cycle is controlled by mechanism substantially identical to those above described and hence a description of one will suffice, the corresponding parts for the carriage 21 being designated by the same reference numerals plus the letter *a*.

A self-centering valve 97, similar to the valve 56, is provided for governing the flow of pressure fluid to the cylinders 37 and 38 of the mechanism for actuating the clamping jaws 34. This valve has a "clamping" solenoid 98 and an "unclamping" solenoid 99. Upon energization of the former, the element 97$^a$ of the valve is shifted to permit the flow of pressure fluid from the pump 52 through supply conduit 55, valve 97 and conduit 100 to the upper ends of the cylinders 37 and 38. At the same time, fluid is exhausted from the lower ends of the cylinders through conduit 101, valve 97, and conduits 72, 73, 74 to the discharge conduit 75. Pistons 102 and 103 are thus moved downwardly in the respective cylinders to move the jaws 34 into active engagement with a wire bar on the fixed jaws 31. Deenergization of the clamping solenoid 98 permits the spring biased valve element to move to its central or neutral position thereby trapping pressure fluid in the cylinders to maintain the clamping pressure. Similarly, energization of the unclamping solenoid 99 moves the valve element 97a in the opposite direction thereby permitting the flow of pressure fluid from a supply conduit 65 through the valve and conduit 101 to the cylinders 37 and 38. At the same time, fluid is exhausted from the upper portions of the cylinder through conduit 100, valve 97 and conduits 72, 73, 74 to the outlet 75.

Vertical movement is imparted to the transfer carriage 44 by admission of pressure fluid to the cylinders 49 under the control of a solenoid-operated valve (Fig. 3) designated generally by the numeral 104. The valve 104 includes a casing 105 having a central chamber in which a valve element 106 is slidably mounted. Axial movement of the valve element 106 is effected by a solenoid 107 and a solenoid 108. Energization of the solenoid 108 serves to establish communication between the pump 52 and the upper ends of the cylinders 49. Thus, fluid flows through conduits 65, 109 and 110 to the interior of the valve 104.

A collar 111 on the valve element 106 uncovers a conduit 112, permitting pressure fluid to flow through the same and then through branch conduits 113 and 114 to the upper ends of the cylinders 49. At the same time, a second collar 115 permits fluid to be exhausted from the lower portion to the cylinders 49 through branch conduits 116 and 117, conduit 118, valve 104, and conduit 119 leading to the sump. As a result, the pistons in the cylinders 49 and the frame 46 are moved downwardly thereby lowering the work carriage 44. Similarly, energization of the solenoid 107 shifts the valve element 106 to the left thereby permitting a flow of fluid to the lower ends of the cylinders 49, the fluid flow being through conduits 65, 109, 110, valve 104, conduit 118, and branch conduits 116 and 117 to the lower ends of the cylinders 49. The shifting of the collar 111 to the left cuts off communication between the conduits 110 and 112, while establishing communication between conduits 119 and 112. As a result, fluid is exhausted from the upper ends of the cylinders 49, through branch conduits 113, 114, conduit 112, valve 104, and conduit 119.

Horizontal movement of the work carriage 44 within the supporting frame 47 is effected by a piston mounted in the cylinder 45 which is mounted on the frame. A valve 120 identical in construction to the valve 104 except for the omission of the means for automatically centering the control element governs the flow of fluid to the cylinder 45. A valve 120 includes a "load" solenoid 121 and a "return" solenoid 122. When the "return" solenoid 122 is energized, the valve element 123 is moved to its extreme right-hand position shown in Fig. 3 permitting fluid from the pump to flow to the outer end of the cylinder 45 through conduits 65 and 109, the valve 120 and a flexible conduit 124. At the same time, fluid is exhausted from the opposite end of the cylinder through a conduit 125, valve 120 and conduit 126. When fluid is supplied in this manner, the piston in the cylinder 45 is shifted to the right as viewed in Fig. 3 so that the carriage 44 is returned to or maintained in its initial or loading position at the extreme right-hand end of the frame 47.

Loading movement of the carriage 44, that is, movement to the left, is effected upon energization of the "load" solenoid 121. Energization of this latter solenoid causes the valve element 123 to be shifted to its extreme left-hand position, thereby connecting the inner end of the cylinder 45 with the supply of pressure fluid through conduit 125, valve 120, and conduit 109, and at the same time connecting the outer end of the cylinder 45 with the return conduit. The supply of pressure fluid to the cylinder 45 in this latter manner causes the piston to be moved outwardly so that the work carriage 44 is shifted to the left.

*The tool heads*

The tool heads 25 and 26 are substantially identical in construction so that a description of one will suffice for both. As above generally described, each includes two milling cutters 27 of the so-called slab type which make several revolutions about the work axis in each machine cycle. To minimize the size of the heads, these cutters are preferably of frusto-conical form. They are disposed to act diametrically opposite of the overhanging end of the work piece with their larger ends spaced apart a distance somewhat greater than the base of the truncated pyramid to be formed. The smaller ends project away from the work piece and are spaced apart a distance somewhat closer than the diameter of the apex end of the pyramid. Preferably, the cutters are disposed with their axes converging toward the longitudinal axis of the work. It will be seen that the slope of the cutter surfaces and the inclination of the axes determine the taper to be formed on the work.

The third cutter 28, which is also of the slab type, has a longitudinal contour corresponding to the diametrical shape of the end surface 19 to be formed, being of generally hour-glass shape in the present instance. This cutter also revolves with the cutters 27 and operates in the final portion of the tool head movement to remove metal to the required depth from the extreme end of the tapered portion and fashion the end surface to the desired shape. To enable the taper and also the end surface 19 to be formed by the separate cutters in a single feeding movement, the cutter 28 is mounted with its axis at right angles to the work axis and also to a plane including the axes of the cutters 27. Possible interference between the cutters 27 and 28 is thus avoided. This arrangement also permits a high degree of compactness to be obtained in the location of the cutter supporting and actuating parts as will appear later.

Generation of the generally flat side faces 18a and the rounded edges 16a during rotation of the cutters 27 is effected by moving the cutters toward and away from the work axis in timed relation to their revolution about the axis. Thus, the cutter axes traverse a path generally shaped as indicated at 27a in Fig. 7. Since the billet is clamped as above described with its polygonal cross-section in a predetermined angular position by the notched jaws 31, the movements of the milling cutters 27 toward and away from the billet may be related to this predetermined angular position in such manner that the flat sides of the tapered ends fashioned on the billet will constitute planar continuations of the flat billet sides.

The three cutters 27 and 28 of each set are carried by a drum 133 (Fig. 4) mounted for rotation about an axis substantially coincident with the axis of a billet within a stationary cylindrical housing 134 on the tool carriage. The drum 133 includes an end member 135 and an opposed disk-shaped end member 136 both rigidly secured to the opposite ends of a cylindrical central member 137. The member 136 is provided with a peripheral flange 138 bearing against one end of the frame. This end member and the adjacent portion of the central member 137 are journaled on an inwardly extending annular shoulder 138a formed on the frame 134. The other end member 135 is journaled in the opposite end of the frame 134 and is provided with an annular ring 139 which cooperates with a gib 140 to prevent endwise movement.

Rotary motion is imparted to the drum by the driving motor 24 through a connection including a worm 141 (Figs. 2, 5 and 6) meshing with a worm gear 142 (Figs. 4 and 5) rigidly secured to the exterior of the central supporting member 137 of the drum. The worm 141 is rotated through the medium of a pair of bevel gears 144 and gears 145, the former being on a shaft 143 driven by the motor 24 through the medium of belts 143a.

To adapt the tapered cutters 27 for bodily movement toward and away from the work axis to profile the end of the billet, these cutters are supported by the drum 133 to swing about an axis 161 (Figs. 2 and 5) of oscillation extending diametrically of the drum and substantially intersecting the longitudinal axis of the billet. For this purpose, the cutters are carried by housings 146 and 147 (Figs. 2, 5 and 6) projecting through the end plate 136 and providing open recesses in which the respective milling cutters are disposed. These housings enclose the driving gearing for the respective cutters and are formed with arcuate T-shaped ribs 148 received in complemental guideways cut in ribs 149 which are cast on the interior of the drum. The guideways and the ribs 148 are of course concentric with the axis 161 of oscillation.

The housings 146 and 147 are oscillated in timed relation to the rotary movement of the drum 133 in such manner that the milling cutters 27 will generate the desired pyramidal shape on the end of a billet 16 which is being machined. Preferably, this is accomplished by means of a cam type actuating mechanism (Figs. 4, 5 and 10).

In the construction illustrated, a cam track or groove 150 is defined by the adjacent edges of a pair of cylindrical plates 151 and 152 rigidly secured to the interior of the drum housing 134. The cam surfaces are followed by rollers 156 on bars 154 slidable endwise in grooves 153 (Fig. 5) formed in the outer periphery of the drum and extending parallel to the drum axis. The bars 154 are connected through the medium of screws 162 to rack bars 157 which are slidable with the first bars and mesh with gear segments 159 on the peripheries of the housings 146 and 147.

It will be seen that as the drum rotates, the bars 154 will be cammed back and forth in an endwise direction as the rollers 156 follow along the cam track 150. Such oscillatory movement is imparted to the cutter housings 146 and 147 so as to move the cutters 27 back and forth between their outermost position shown in full lines in Fig. 5 to the innermost position indicated in dotted outline. The cam groove 150 is of course shaped to correlate the movements with the rotation of the drum in a manner such as to cause the desired polygonal shape to be generated. Since the cam track and the work being machined are stationary, the oscillatory movements of the cutters may be timed accurately with respect to the work thereby enabling the sides of the truncated pyramid to be formed as continuations of the side faces of the billet.

Preferably, the milling cutters 27 are mounted so that their active edges lie along radii extending from the center of oscillation 161.

Selective adjustment of the angle of the taper cut on the ends of the billet may be effected by varying the position of the paths in which the housings 146 and 147 oscillate. This is accomplished by changing the position of the racks 157 relative to the cam 150 through the medium of the screw 162. As shown in Fig. 5, the latter comprises a sleeve provided with right and left hand threaded ends which thread into the follower bar 154 and the rack 157 respectively. This sleeve is rigid with a tubular shaft 163 having an outer squared end 167 to which a wrench may be applied for turning the screw sleeve and thereby changing the position of adjustment of the rack bar 157.

In view of the substantial power transmitted through the rack connection, it is desirable to take up normal clearance between the screw and the bars 157. To this end, the outer end of the shaft 163 is threaded into a nut 164 which may be tightened to take up the clearance between the rack bar 157 and the screw. The end of the screw threading into the bar 154 has a tongue and groove connection 160 with a threaded plug 165 into which is threaded a shaft 166 having a head 163a projecting beyond the outer end of the tube 163. By turning the shaft 166 relative to the tube, the screw 162 and the plug 165 may be moved axially relative to each other to release or take up the clearance between the screw and the bar 154.

The driving connection between the motor 24 and the several milling cutters on each tool head includes a multiple belt 170 passing over the motor pulley and a pulley 171 (Fig. 4) carried by a shaft 172 journaled in anti-friction bearings in the outer end member 135 of the drum 133. The shaft 172 is connected by bevel gears 175 with a cross-shaft 173 journaled in anti-friction bearings carried by opposed sleeves 174 on the drum. A second shaft 176 mounted in anti-friction bearings carried in sleeves 177 is in turn driven from the shaft 173 through spur gears 178.

Fast on the shaft 176 is a gear 179 meshing with an idler gear 180 which in turn meshes with a gear 181 carried by the shaft 182 of the milling cutter 28. One end of the shaft 182 is journaled in anti-friction bearings carried in a housing 183 (Figs. 1 and 4) secured to the outer side of the end member 136 of the drum while the opposite end of the cutter shaft is journaled in a bearing 184 in a bracket 185. The latter is slidable along dove-tail ways 185a to permit retraction of the cutter bearing 184 and removal of the cutter 28 for replacement or repair.

The driving connection from the shaft 176 to the milling cutters 27 includes a worm 186 fast on the shaft and meshing with worm gears 187 (Fig. 5). The latter are on shafts 189 journaled in the housings 146 and 147 and supported at their inner ends by bearing brackets 190. A gear 191 on the outer end of the shaft 189 meshes with a gear 192 on the outer end of the shaft 193 to which one milling cutter 27 is keyed. The outer end portion of the shaft 193 is supported in suitable anti-friction bearings while the inner end is journaled in a sleeve bearing carried by a removable bracket 194. The outer bearing is supported by a member 195 which may be removed readily to facilitate replacement or repair of the cutter.

The driving connection which extends from the shaft 176 to the other cutter 27 and is supported by the housing 147 is constructed similar to the arrangement above described except that an idler gear or other device is introduced in the connection to cause the associated cutter to be driven in the reverse direction. In both instances, the driving connection to the cutters 27 are correlated with the direction of rotation of the drum 133 in a manner to cause the cutters to take conventional or so-called up milling cuts. Thus, the cutters rotate as indicated by the arrows in Fig. 7 when the drum is, as in the present instance, turned counter-clockwise as indicated in this figure.

*Electric circuits*

An electrical control arrangement is provided by means of which (1) the entire machine may be operated automatically through a complete cycle of operation, (2) the cycle may be interrupted at any point and later continued as desired, (3) the tool heads may be retracted immediately when an emergency condition arises, and (4) the work clamp and the work transfer carriage may be individually controlled following an emergency return of the tool heads. In general, such control is obtained through the use of limit switches controlling the distribution valves above referred to in response to the various movements of the work clamp, the work carriage, the work carriage elevating mechanism, and the tool heads.

The preferred disposition of the limit switches with respect to the cooperating moving parts of the machine is shown in Fig. 3 and the wiring diagram (Fig. 8) shows the various electric driving motors, valve control solenoids, and the energizing and control circuits therefor. The tool head driving motors 24 as well as the pump motor 53 are connected and disconnected from the supply lines 200, 201 and 202 by their respective contactors 203, 204 and 205. Current is supplied to the various solenoids and relays of the automatic control circuit through feeders 206 and 207, which are connected respectively to supply lines 200 and 202.

Operation of the electric driving motors is initiated by a momentary actuation of a normally open push button "start" switch 208 on a control panel (Figs. 1 and 1a) which may be disposed at a point within the convenient reach of the machine operator. Upon closure of this switch, a circuit is completed from feeder 206 through conductor 209, switch 208, and conductor 210 to the common terminals of actuating windings 211 and 212 of the contactors 203 and 204, the other terminals of these windings being permanently connected to supply line 202. Energization of the contactor windings 211 and 212 closes the respective main line contacts 213 and 214 of the contactors as well as sealing contacts 215 and interlock contacts 216 on the contactor 203 and interlock contacts 217 and 218 on the contactor 204.

The interlock contacts 217 complete an energizing circuit for actuating winding 219 of the pump motor contactor 205. One terminal of this winding is permanently connected to supply line 202 while the other terminal is connected to feeder 206 through conductors 220 and 221, contacts 217, conductors 222 and 223, a normally closed push button "stop" switch 224 on the control panel and conductor 225. The pump motor contactor 205 is thus energized at substantially the same time as the tool head motors, and its main line contacts 226 are closed as well as its interlock contacts 227, 228 and 229. The closure of sealing contacts 215 of the contactor 203 and interlock contacts 229 on the contactor 205 completes a sealing circuit for the actuating windings of contactors 203 and 204 through conductor 210, sealing contacts 215, conductor 230, interlock contacts 229, and conductors 231 and 209, to feeder 206.

Contacts 227 on the pump motor contactor 205 complete a separate sealing circuit for its actuating winding 219, which is independent of the contactor 204. The interlock contacts 216, 218 and 228 on the contactors 203, 204 and 205, respectively, are interposed in the control circuits, as hereinafter described, in such manner that the various distribution valves and the like cannot be actuated except when the associated driving motors of the machine are in operation.

It will be seen that the tool head driving motors 24 as well as the pump motor 53 are started and maintained in operation in response to a momentary actuation of the starting switch 208. These motors may be stopped at will by opening the normally closed push button "stop" switch 224 which breaks the sealing circuits for all three of the motor contactors, thereby disconnecting the motors from the line.

As soon as current is supplied to the feeders 206 and 207, the starting control circuit is conditioned for the initiation of an automatic cycle of operation. The control circuit is preferably so arranged, however, that this conditioning will not take place if the tool heads are for any reason out of their fully retracted starting positions. The possibility of damage to the machine parts or a work piece by movement of the parts in any other than the proper sequence is thus avoided.

In the particular arrangement illustrated, one set of contacts 232 and 233 of each of the limit switches 234 and 235 is closed by dogs 236 and 237 (Fig. 3) when the tool heads 25 and 26, respectively, are in their fully retracted initial positions. When these contacts are closed, an energizing circuit is completed for the actuating winding 238 of a relay 239. Thus, one terminal of the winding 238 is permanently connected to feeder 207 while the other is connected to feeder 206 through conductor 240, normally closed contacts 241 of a relay 242, conductor 243, switch contacts 232, conductor 244, switch contacts 233 and conductor 245. This energization of the relay winding 238 causes its associated normally open contacts 246 to close, thereby completing an energizing circuit for the actuating winding 247 of the relay 242. Energization of this winding opens the associated normally closed contacts 241, thereby deenergizing the relay 239 and dropping it out after a momentary closure. At the same time, however, normally open contacts 248 of relay 242 are closed, completing a sealing circuit for its energizing winding about the contacts of relay 239 through conductor 249, contacts 248, conductors 250 and 251, normally closed contacts 252 of a relay 253 and thence through conductors 254 and 255 to feeder 206.

Operation of the relay 242 serves to close its normally open contacts 256 and also open its normally closed contacts 257. The contacts 256 are arranged in series relation with a normally open "cycle start" push button switch 258 so that the relay 242 must be energized before the cycle starting switch 258 is operative. From the foregoing, it will be seen that the automatic cycle of operation cannot be initiated by the "cycle start" switch 258 until the relay 242 has been energized and that this relay cannot be energized until the relay 239 has picked up momentarily which, in turn, can only take place when the tool heads are fully retracted as evidenced by closure of the contacts 232 and 233 of limit switches 234 and 235.

The circuit is also preferably such that the work transfer "return" solenoid 122 will be energized as soon as current is supplied to feeders 206 and 207 in order that the work carriage 44 will be located at its proper starting position, but this will take place only if the frame 47 is in its lowered position. To this end, one terminal of the solenoid 122 is permanently connected to feeder 207 while the other terminal is connected to feeder 206 through conductor 259, normally closed push button switch 260, conductor 261, contact 262 of limit switch 263, conductor 264, contact 265 of limit switch 266, conductors 267 and 268, limit switch 269, conductor 270, normally closed contacts 271 of an emergency stop relay 272, conductor 273, interlock contacts 228 of the pump motor, contactor 205 and conductor 274. The limit switches 263 and 266 are double contact two-position snap acting switches and as shown in Fig. 3 are arranged to be actuated by dogs 275 and 276 respectively carried by the transfer mechanism frame 47. The contacts 262 and 265 thereof are closed only when the frame 47 is in its lowered position so that the automatic cycle of operation cannot be initiated until the frame 47 has been lowered preparatory to starting. The limit switch 269 is a single contact switch normally biased to its open position and adapted to be closed by an actuating nut 277 adjustably positioned on screw 278 (Fig. 3) secured to the rail 36.

It will be seen that the energizing circuit of the "return" solenoid 122 described above will be completed only when three conditions are fulfilled, namely, that the work supporting frame 47 is in its lowered position, the clamping jaws 34 are in their lowered position, and the pump motor 53 is in operation. Normally, when the machine is idle, the tool head carriages 21 are fully retracted, the work transfer mechanism is in its initial position, and the movable jaws 34 are lowered so that as soon as current is applied to the feeders 206 and 207, the relay 242 will be closed by the momentary closure of the relay 239 and the "return" solenoid 122 will be energized. The energization of this "return" solenoid will of course serve to move the work carriage 44 longitudinally to its initial position if it should have been displaced therefrom.

*Operation of electric circuits*

The sequence of energization and deenergization of the various valve operating solenoids and their associated control relays as well as the opening and closing of the various limit switches is illustrated in the program chart (Fig. 9) which may be used as an aid in following the cycle. The various steps in the cycle are listed vertically while the several solenoids, relays and switches are listed horizontally. The solid black squares indicate energization of the corresponding elements while the white squares indicate deenergization thereof. Similarly, in the columns for the switches, the shaded squares indicate closure of the corresponding switches while the white squares indicate that the switches are open. Two columns are provided in the chart for these limit switches which have two sets of contacts.

The automatic cycle of operation of the machine is initiated by momentary closure of the normally open "cycle start" button switch 258. The closure of this switch completes an energizing circuit for actuating winding 279 of a relay 280 which serves to control the "clamp release" solenoid 99. Thus, one terminal of the winding 279 is connected to feeder 207 while the other terminal is connected to feeder 206 through conductor 281, switch 258, conductor 282, contacts 256 of relay 242, conductor 283, limit switch 284, conductor 285, contacts 286 of a double contact two-position limit switch 287, conductors 288 and 289, normally closed contacts 290 of the emergency stop relay 272 and conductor 291. The limit switches 284 and 287 coact with dogs on the work transfer carriage 44 in such manner that the switch 284 is closed and contacts 286 of switch 287 are closed when the carriage is in its initial starting position shown in Figs. 1 and 3.

Energization of the relay 280 upon closure of the "cycle start" switch 258 closes its normally open contacts 292, 293 and 294 and opens its normally closed contacts 295. The closure of contacts 292 completes a sealing circuit for the relay actuating winding 279 in shunt with the momentarily actuated starting switch 258 through conductors 281 and 296, contacts 292 and conductor 297, thereby completing the first or cycle starting step.

Closure of contacts 294 as described above completes the energizing circuit for the "clamp release" solenoid 99 so that the clamping jaws 34 are moved upwardly in the second step in the cycle. The circuit extends from the feeder 207 through the solenoid 99 to normally closed push button switch 299, conductors 300 and 301, relay contacts 294, conductors 302 and 289, relay contacts 290 and conductors 291. The simultaneous opening of the normally closed relay contacts 295 serves to break the energizing circuit of the oppositely acting "clamp" solenoid 98. The closure of contacts 293 serves to energize the relay 253 so that the initially closed relay 242 will be deenergized in preparation for the subsequent completion of other energizing circuits in later steps of the cycle. Thus, one terminal of actuating winding 303 of relay 253 is permanently connected to feeder 206 while the other terminal thereof is connected to feeder 207, conductor 304, relay contacts 293, conductors 305 and 306, limit switch 307 and conductor 308. Upon reference to Fig. 3, it will be seen that the limit switch 307 just referred to is normally maintained closed. The dog 307ᵃ on the tool carriage 22 is located to open the switch as the follower encounters the surface 307ᵇ in the latter part of the rapid approach movement. Energization of the relay 253 as described in response to energization of the relay 280 opens its associated normally closed contacts 252 and closes its normally open contacts 309 and 310. This opening of the contacts 252 breaks the energizing circuit for relay 242.

The upward or unclamping movement of the jaws 34 in the second step of the cycle serves to permit the limit switch 269 to open, and upon completion of this movement, an actuating nut 311 on the screw 278 closes a limit switch 312 to initiate the third step in the cycle of operation. In this step, the work carriage 44 is raised to lift the billet off from the brackets 42. Closure of the limit switch 312 completes an energizing circuit for the "raise" solenoid 107. This circuit extends from the feeder 207 through the conductor 313, normally closed push button switch 314, conductor 315, limit switch 312, conductors 316 and 285, contacts 286 of limit switch 287, conductors 288 and 289, relay contacts 290 and conductor 291 to the feeder 206. Energization of the solenoid 107 shifts the valve 104 to supply pressure fluid to the hydraulic cylinders 49 and thus causes the work carriage 44 to be raised.

Completion of the upward movement of the frame 47 and the carriage 44 causes the dogs 275 and 276 to actuate limit switches 263 and 266 and thereby initiate the fourth step of the cycle. This actuation of the limit switches 263 and 266 opens the closed contacts 262 and 265 thereof while simultaneously closing contacts 317 and 318. The opening of contacts 262 and 265 deenergizes the "return" solenoid 122 while the closure of the contacts 317 and 318 completes an energizing circuit for the oppositely acting "load" solenoid 121, thereby shifting valve 120 to supply pressure fluid to cylinder 45 for moving the carriage 44 to the left as viewed in Fig. 3. The circuit extends from the feeder 207 through conductor 319, normally closed push button switch 320, conductor 321, limit switch contacts 317, conductor 322, limit switch contacts 318, conductor 289, relay contacts 290 and conductor 291 to the feeder 206. Two limit switches 263 and 266 with their corresponding contacts connected in series are preferably utilized rather than a single limit switch in order that the cycle of operation will be interrupted if the frame 47 should be tilted so that either of the limit switches at the ends of the frame is not actuated.

The fifth step of the cycle, namely, the lowering of the frame 47 and carriage 44 to deposit the billet carried thereby on the fixed jaws 31 is initiated by a closure of contacts 323 of the limit switch 287 upon completion of the traversing movement of the carriage 44. Closure of contacts 323 completes an energizing circuit from the "lower" solenoid 108 to feeder 206 through conductor 324, normally closed push button switch 325, conductor 326, contacts 323, conductors 327, 288 and 289, relay contacts 290 and conductor 291. The other terminal of the solenoid is permanently connected to the second feeder 207.

Simultaneously with the closing of contacts 323 of limit switch 287, the contacts 286 thereof are opened thereby deenergizing the oppositely acting "raise" solenoid 107. Upon such energization of the "lower" solenoid 108 and deenergization of the "raise" solenoid 107, the valve 104 is shifted to cause downward movement of the frame 47 so that a billet positioned in the notches 50 is deposited on the fixed jaws 31. The opening of contacts 286 of the limit switch 287 also serves to deenergize the winding 279 of relay 280 so that this relay moves to its initial position in preparation for the next step in the cycle of operation. The winding 303 of the relay 253 remains energized by virtue of the closed contacts 310 and the conductor 238 to conductor 306.

The billet is clamped in the sixth step of the cycle after which the work carriage may be returned to its loading position. This step is initiated by a limit switch 328 arranged to be actuated by a projection on the bar 276 carried by transfer frame 47. This limit switch is provided with a pair of oppositely acting contacts 329 and 330 interposed respectively in the circuits of the "clamp" and "release" solenoids. Completion of the downward movement of the frame 47 serves to close the contacts 329 and open the contacts 330, thereby completing an energizing circuit for the "clamp" solenoid 98 and deenergizing the "release" solenoid 99. It will be noted that even though these contacts of the limit switch 328 were positioned in this manner at the beginning of the cycle of operation, they did not serve to control the "clamp" and "release" solenoids because the relay 280 was energized. At the present point in the cycle, however, the relay 280 is deenergized so that the limit switch 328 is restored to control of the circuits. Thus, one terminal of the "clamp" solenoid 98 is permanently connected to feeder 207 while the other terminal thereof is connected to feeder terminal 206 through conductor 331, normally closed push button switch 332, conductor 333, limit switch contacts 329, conductor 334, normally closed contacts 257 of relay 242, conductor 335, normally closed contacts 295 of relay 280, conductors 336 and 273, interlock contacts 228 on contactor 205 and conductor 274. The "release" solenoid 99 is deenergized since its alternative energizing circuits through limit switch contacts 330 and contacts 294 of the relay 280 are both open-circuited. Consequently, the movable jaws 34 are forced downwardly against the billet resting on the fixed jaws 31 thereby clamping the same firmly in position. When the clamps engage the work, the pressure in the line 100 increases sufficiently to close the pressure switch 352.

Downward movement of the movable clamping jaws permits the associated limit switch 312 to open and as an incident to completion of the clamping movement, the associated limit switch 269 is closed. Such actuation of these limit switches completes the initiation of the seventh step in the cycle, namely, the return of the work carriage 44 to its initial position at the right-hand end of the frame 47. Thus, upon closure of the limit switch 269, the "return" solenoid 122 is energized through the circuit previously described. The valve 120 is thus set by the "return" solenoid 122 to supply pressure fluid to the cylinder 45 for traversing the carriage 46 to the right as viewed in Fig. 3.

Near the end of this return movement, a dog thereon momentarily actuates a limit switch 337 to start the eight step in the cycle, namely, the rapid approach movement of the tool head carriages 21 and 22. The "feed" solenoids 68 and 68ᵃ which control the flow of pressure fluid for imparting such a rapid approach movement are in turn controlled by a feed relay 338 having a winding 339 permanently connected to feeder 207. The other terminal is connected to feeder 206 upon the closure of limit switch 337 through conductor 340, contacts 341 of a time delay relay 342, conductors 343 and 344, limit switch 337, conductor 267 and 268, limit switch 269, conductor 270, relay contacts 271, conductor 273, interlock contacts 228 and conductor 274. Such energization of the winding 339 closes its associated main contacts 345 and sealing contacts 346. The main contacts 345 connect the common terminals of the "feed" solenoids 68 and 68ᵃ, interconnected by a conductor 347, to feeder 206 through conductor 348, interlock contacts 216, conductor 349, interlock contacts 218 and conductor 350. The interlock contacts 216 and 218 prevent traversing movement of the tool head carriages except when the tool driving motors 24 are in operation. The sealing contacts 346 of relay 338 complete an energizing circuit for the winding 339 thereof in shunt relation with respect to the momentarily actuated limit switch 337 through a conductor 351 and a safety pressure switch 352.

Upon reference to Fig. 3, it will be seen that the pressure switch 352 is normally biased to its open position by a spring 353 and is maintained closed by pressure fluid supplied to the hydraulic cylinders 37 and 38 to maintain the jaws 34 in clamping position. Thus, if the clamping pressure fails for any reason, the movement of the tool head carriages will be arrested by opening of the pressure switch 352 and consequent deenergization of the feed relay 338 and its controlled feed solenoids 68 and 68ª.

It should be noted at this point that the momentary closure of the limit switch 337 during the movement of the transfer rack 46 to the left while the billet was being carried to the clamping jaws did not serve to energize the feed relay 338 since the limit switch 269 was open at this time and consequently, an energizing circuit therefor was not completed.

The rapid approach movement of the tool heads 21 initiated by the momentary closure of limit switch 337 continues until the milling cutters 27 come in contact with the ends of the billet at which time the rate valves 71 and 71ª gradually diminish the traversing speed of the tool heads in order that there will be no overloading due to the increasingly greater amount of metal removed by the cutters. The adjustable mounting of the cam plates which control the rate valves 71 and 71ª makes it possible to initiate this decrease in feed rate at any desired point so as to accommodate billets of different lengths.

It should be noted that as the tool head carriages 21 and 22 advance toward the work, the dogs 236 and 237 release the limit switches 234 and 235 permitting contacts 232 and 233 thereof to open while closing contacts 354 and 355 thereof. The closure of these latter contacts conditions the energizing circuits of the "return" solenoids 77 and 77ª for subsequent completion. As the movement of the carriages 21 and 22 continues, the dog 307ª opens the limit switch 307, thereby interrupting the sealing circuit of the winding 303 of relay 253. Such deenergization permits contacts 252 to close thereby conditioning the energizing circuit of the winding 241 of relay 242 for completion upon subsequent energization of its associated relay 239. The contacts 309 which are shunted across the pressure switch 352 are also opened thus placing the pressure switch 352 in full control of the circuit to the relay winding 339.

The tenth step in the cycle of operation is a dwell or time delay step in which the tool carriages 21 and 22 remain at the forward extremities of their movements while the milling cutters 28 cut the rounded end surfaces 19 on the billet and the cutters 27 finish the tapered end to a symmetrical pyramidal contour. Stopping of the carriages is caused by closure of a pair of limit switches 356 and 357 by dogs 236 and 237. Closure of these limit switches completes an energizing circuit for actuating winding 358 of the time delay relay 342. One terminal of this winding is permanently connected to feeder 207 while the other terminal is connected to feeder terminal 206 through conductor 359, limit switch 356, conductor 360, limit switch 357, conductors 361 and 362, pressure switch 352, conductors 267 and 268, limit switch 269, conductor 270, relay contacts 271, conductor 273, interlock contacts 228 and conductor 274. A momentary completion of this energizing circuit causes the associated sealing contacts 363 to be closed, completing an energizing circuit in shunt relation with the limit switches 256 and 357 as well as the pressure switch 352 through conductors 364 and 267.

The time delay relay 342 is also provided with normally closed contacts 341 and contacts 365 which are normally open and are connected to a dash pot 366 which serves to slow up their closing movement. As a result, the contacts 341 and 365 are not actuated after the relay winding 358 has been energized until the cutter drum 133 has turned through approximately one and one-half revolutions. During this latter rotary movement, the heads are held stationary by the fixed stop 22ª (Fig. 2) while the cutters 28 mill the desired rounded blunt ends on the billets.

Opening of the normally closed contacts 341 interrupts the sealing circuit of the actuating winding 339 of the feed relay 338. As a result of the opening of contacts 345 of this latter relay, the "feed" solenoids 68 and 68ª are deenergized so that the associated valves move to their central positions under the bias of their centering springs, thereby cutting off the further flow of pressure fluid to the cylinders 29 and 29ª and stopping the tool carriages.

Closure of the relay contacts 365 after the time delay interval serves to complete an energizing circuit for a winding 367 of a rapid return relay 368 thereby initiating the eleventh or head return step in the cycle. One terminal of the winding 367 is permanently connected with the feeder 206 while the other terminal is connected to feeder 207 through conductors 369 and 370, relay contacts 365, and then through conductors 371 and 372. The resultant closure of the associated relay contacts 373 of the rapid return relay 368 completes the energizing circuits for the rapid "return" solenoids 77 and 77ª, these circuits having been previously conditioned for completion by closure of contacts 354 and 355 of the limit switches 234 and 235 as described above. One terminal of these solenoids is permanently connected to feeder 207 while the other terminals are connected through the switches 354 and 355 to a conductor 375, relay contacts 373, and a conductor 376. Energization of these rapid "return" solenoids serves to shift the valves 56 and 56ª in such manner as to supply pressure fluid to forward ends of the cylinders 29 and 29ª thereby causing the tool carriages to be rapidly returned.

Upon completion of the return movements, the dogs 236 and 237 actuate the respective limit switches 234 and 235 to stop the carriages and to restore the control circuits to their original condition. Thus, contacts 354 of the limit switch 234 are opened while contacts 232 thereof are closed and similarly contacts 355 of the limit switch 235 are opened while the contacts 233 are closed. Opening of the contacts 354 and 355 deenergizes the associated rapid "return" solenoids 77 and 77ª so that the valves 56 and 56ª are again moved to their self-centered positions in which the flow of pressure fluid is cut off and the carriages stopped. Also, closure of the contacts 232 and 233 as described completes an energizing circuit for the relay 239 so that its contacts 246 close momentarily thereby energizing relay 242. The opening of contacts 257 of this latter relay breaks the energizing circuit for the "clamp" solenoid 98. It will thus be seen upon reference to the program chart Fig. 7 that the control apparatus is in the same condition as at the beginning of the cycle of operation. Subsequent cycles may be initiated by pressing the "cycle start" button 258.

Auxiliary control apparatus

In case of emergency, the machine may be stopped at any point in the automatic cycle. For this purpose, an emergency push button type of "stop" switch 379 has been provided. Closure of this switch completes an energizing circuit for actuating winding 380 of the emergency stop relay 272. One terminal of this winding is permanently connected to feeder 206 while the other terminal is connected to feeder 207 through a conductor 380ᵃ, switch 379, and conductor 372. Energization of winding 380 causes the associated normally closed contacts 271 and 290 to be opened. Opening of the emergency stop relay contacts 271 open-circuits the "load" and "return" solenoids 121 and 122 as well as the feed relay 338 which controls the feed solenoids 68 and 68ᵃ. Similarly, the emergency stop relay contacts 290 cause the "raise" and "lower" solenoids 107 and 108 as well as the clamp release solenoid 99 to be open-circuited. The clamp relay 98 remains energized through the normally closed contacts 257 and 295 of the relays 242 and 280, however, so long as contacts 329 of the limit switch 328 are closed so that if a billet is in position to be engaged by the tools, it will remain clamped even when the machine is stopped for emergency. This is desirable as the electric motors 24 and 53 are not stopped by actuation of the relay 272 but only upon opening of the "stop" switch 224.

An arrangement is preferably provided for energizing the "return" solenoids 77 and 77ᵃ in response to actuation of the emergency stop relay 272 so as to retract the tool carriages 21 and 22 to their initial positions in case they are displaced therefrom. If the tool carriages are so displaced, the limit switches 234 and 235 will be positioned for closure of their respective contacts 354 and 355 thereby conditioning the energization circuits of the rapid "return" solenoids for completion by the rapid return relay 368. This latter relay will be energized upon closure of contacts 381 of the emergency stop relay. Thus, while one terminal of the rapid return relay winding 367 is connected to feeder 206, the other terminal is connected to feeder 207 through conductor 369, emergency stop relay contacts 381, conductors 382, 371 and 372.

A control arrangement is also preferably provided by means of which the devices by which certain of the machine functions are controlled are conditioned for individual operation by a series of manually operable push button switches on the control panel which switches are normally maintained ineffectual but are rendered operative as an incident to energization of the emergency stop relay 272. Thus, provision is made for clamping and unclamping the work, raising and lowering the work carriage, or shifting the latter between its two positions. If, after an emergency stop, it is desired to unclamp the work piece, the push button switch 299 associated with "release" solenoid 99 is moved to close a pair of contacts 383, thereby completing an energizing circuit for the solenoid. At the same time, such movement of the switch 299 serves to open the mechanically connected switch 332 to interrupt the energizing circuit of the "clamp" solenoid 98. Closure of the contacts 383 connects one terminal of the "release" solenoid 99 to feeder 206 through conductors 384, 385, the then closed contacts 386 on the emergency stop relays 272 and conductor 291. Similarly, the "raise," "lower," "load," and "transfer" solenoids may be energized by connecting them to feeder 206 upon closure of their respective associated push button switches 314, 325, 320 and 260 on the control panel. An extra button 387 is associated with the emergency "stop" switch 379 in order to shift the latter back to its open position.

It will be apparent from the wiring diagram that the various solenoids controlling the functions of clamping and unclamping the work, raising and lowering the work carriage, or advancing and returning the latter are normally rendered operative through a switch 290 which remains closed while the emergency stop relay 272 is de-energized. Upon energization of the latter relay by depression of the emergency stop button, the switch 290 is opened thereby disabling the normal control of the various solenoids, and the switch 386 is closed thereby rendering the push button switches 260, 299, 314, 320 and 325 in operative control of the relays by which the various individual functions above enumerated may be initiated. It will be understood that the switch 379 may be used to condition the control circuits for individual manual control of the individual solenoid energizing circuits through the medium of the push button switches described above whenever the operator desires and irrespective of the occurrence of some particular emergency condition.

Résumé of operation

When the machine illustrated is normally idle, the tool carriages 21 are fully retracted, the frame 47 for supporting the work is in its lowered position, and the carriage 46 is in loading position at the right-hand end of the machine viewed in Fig. 1 preparatory to receiving the next wire bar to be machined. Let it be assumed that a billet or wire bar has been placed in the notches on the brackets 42 and thus located with sufficient accuracy to be engaged properly by the transfer carriage 44. The longitudinal position of the bar may be determined by reference to a suitable gauge.

To start the machine, the operator first closes the motor starting switch 208 momentarily which causes energization of the tool head driving motors 24 as well as the pump motor 53. When the motors 24 are running, the milling cutters 27 and 28 and the drums 133 are rotated, the cutters 27 thus being moved in and out by the cam 150. Closure of the motor contactors also conditions the control circuits for operation by completing portions thereof through the interlock contacts.

If the operator wishes to operate the machine through a complete cycle, he momentarily closes the "cycle start" switch 258. The machine then proceeds to move automatically through a complete cycle of operation. In this cycle, the frame 47 and work carriage are first moved upwardly so that the wire bar carried on the brackets 42 is lifted and transferred to the carriage. In the ensuing traversing movement of the carriage 44 to the left, the bar is moved to a position about the jaws 31. As the frame 47 is then lowered, the bar is deposited onto the jaws 31 and guided by the converging sides thereof to the proper angular position. Next, the jaws 34 are lowered to clamp the bar. After clamping of the bar and retraction of the work carriage to loading position, the tool carriages 21 and 22 are rapidly advanced until the milling cutters are in position to engage the exposed ends of the clamped bar at which time the cam plates 80 and 80ᵃ operating on the rate valves 71 and 71ᵃ to cause the traversing speed of the tool heads to be progressively decreased as the area of contact between the milling cutters and the wire bar increases.

During the feeding movement, the cutters 27 rotate about their own axes, simultaneously revolve about the axis of the wire bar, and are oscillated toward and away from the wire bar during the traversing feed movement thereof. The result of these combined motions through a plurality of revolutions is to mill tapered ends on the wire bar having the shape of truncated pyramids. This taper is reduced to symmetrical form as the tool heads dwell for a short period at the inner end of their advancing movement. In the latter part of the feed and during this dwell, the milling cutters 28 remove the slag containing metal from the ends of the bar and fashion these ends to a rounded contour. At the completion of the milling operations, the carriages 21 and 22 are retracted at a rapid return rate to their initial positions and the clamping jaws 34 are moved upwardly releasing the wire bar. The frame 47 and carriage 44 are then raised so that the machined wire bar is engaged by notches 51 while the next bar is shifted from the brackets 42 to the notches 50. As the carriage is traversed to the left, the machined wire bar is carried to the unloading position and the next bar is presented to the fixed jaws 31. Subsequent cycles of operation may be carried out in the same manner, being initiated by a momentary closure of the cycle start switch 258.

In the event that the operator wishes to have the machine perform some individual one of the various steps in the cycle, he first closes the emergency stop switch 379 thereby changing over the control from full automatic to individual step control. The selected individual step in the series of operations may then be had by manipulating the corresponding one of a series of push button switches 299, 332, 314, 325, 320 and 260.

We claim as our invention:

1. A machine for preparing a metal bar for rolling or wire drawing having, in combination, a work support, means for clamping said bar on said support with one end exposed for machining, a tool carriage mounted to slide in a direction longitudinally of the supported bar, a head rotatably mounted on said carriage to turn about the longitudinal axis of said bar, a pair of power driven frusto-conical milling cutters rotatably mounted on said head and disposed on opposite sides of said bar with their active faces converging toward the bar axis and in a direction away from said end for fashioning a tapered end portion on said end, said cutters being adapted for bodily movement toward and away from the axis of said bar, a third power driven milling cutter of hour-glass contour rotatably mounted on said head between the adjacent ends of said first mentioned cutters so as to turn about a diameter of said head extending transversely of the axes of said first mentioned cutters, said third cutter being shaped to fashion a smooth surface on the end of said bar, power actuated mechanisms for advancing and retracting said carriage and simultaneously rotating said head, and power driven means operating to move said first mentioned cutters in unison toward and away from said bar and in timed relation with respect to the rotation of said head.

2. A machine for preparing a metal bar for rolling or wire drawing having, in combination, a work support, means for clamping said bar on said support with one end exposed for machining, a tool carriage mounted to slide in a direction longitudinally of the supported bar, a head rotatably mounted on said carriage to turn about the longitudinal axis of said bar, a pair of power rotated milling cutters rotatably mounted on said head with their active faces inclined to the axis of the bar for fashioning a tapered end portion on the end of the bar, said cutters being adapted for bodily movement toward and away from the axis of said bar, a third power driven milling cutter rotatably mounted on said head between the adjacent ends of said first mentioned cutters and shaped to fashion a smooth surface on the end of said bar, power actuated mechanisms for advancing and retracting said carriage and simultaneously rotating said head, and power driven means operating to move said first mentioned cutters toward and away from said bar and in timed relation with respect to the rotation of said head.

3. A machine for operating upon the squared end of a metal bar having, in combination, work adapted to support a bar with one end exposed for machining, a tool support opposite said end, said supports being mounted for relative rotation about an axis extending longitudinally of said bar, power actuated mechanism operable during such rotation to feed said supports toward each other in a direction longitudinally of said bar and then cause a pause in such movement while the supports continue to rotate, cutter means on said tool support having an effective cutting edge disposed at an angle to said axis and operating during such feeding movement and in a plurality of revolutions of relative rotation to remove a multiple spiral layer of metal from said end whereby to taper the same, said cutter means operating during said pause to reduce said taper to a surface symmetrical with respect to said axis, and an independent cutter operable in the final portion of said feeding movement and during said pause to cut a convexly curved end surface on the tapered portion of the bar.

4. A machine for preparing a metal billet of polygonal cross section for rolling and wire drawing, said machine having, in combination, work and tool supports mounted for relative rotation and for relative reciprocation along the axis of rotation, means for clamping a billet on said work support with one end exposed for machining and with the billet axis substantially coincident with said rotational axis, a cutter, on said tool support operating during such rotational and reciprocatory movements to remove successive layers of metal from said end and form a truncated pyramid thereon, and a second cutter on said tool support operable during relative movements between said supports to perform a metal-removing operation on the end of said pyramid and shape the end surface thereof to a convexly curved contour.

5. A machine for preparing a metal billet of polygonal cross section for rolling and wire drawing, said machine having, in combination, a member for supporting a billet with one end overhanging the member, a tool supporting member, power actuated mechanism for relatively rotating said members about the longitudinal axis of said billet and for relatively reciprocating the members along said axis, a cutter operating during such rotation and movement of said members toward each other to remove metal from said end and form a taper thereon, said cutter being mounted for movement toward and away from said axis, means operating in timed relation to said rotary movement to move said cutter relative to its supporting member and reduce said taper to a truncated pyramid with beveled corners, and a second cutter on said member operating in the final portion of said relative movements to shape the end of said pyramid.

6. A machine tool for tapering the end of a metal bar having, in combination, a support for the bar, a tool support, said supports being mounted for relative rotation about the axis of a bar supported on the work support and also for relative movement longitudinally of said axis, a rotary milling cutter rotatably mounted on the tool support with its axis extending generally longitudinally of said bar and shaped to form a taper on the bar during said relative rotational and axial movements between said supports, and a second milling cutter mounted on said tool support to rotate about an axis extending transversely of the axes of said bar and said first mentioned cutter, said second cutter operating to shape the end of the taper formed by said first mentioned cutter to a generally convex contour.

7. A machine for preparing a metal billet of polygonal cross section for rolling and wire drawing, said machine having, in combination, work and tool supports mounted for relative rotation and for relative reciprocation about the axis of rotation, means for clamping a billet on said work support with one end exposed for machining and with the billet axis substantially coincident with said rotational axis, cutter means operating during continuous relative rotation between said members and movement thereof toward each other to form a truncated pyramid on said end, and a second independently operable cutter on said tool support operating in the latter part of said rotary and reciprocatory movements to cut a convexly curved end on said pyramid.

8. A machine for tapering one end of a metal bar of polygonal cross section having, in combination, means for supporting said bar with the sides thereof in predetermined angular positions, a tool support rotatable about an axis extending longitudinally of a supported bar, two members pivotally supported on said support for movement of their free end portions toward and away from the support axis, a pair of cutters rotatably mounted on the respective members and angularly spaced for engagement with corresponding portions on different sides of said end, said cutters being shaped to cut tapers on said bar, power driven means for rotating the support and transmitting rotary power to said cutter, a stationary cam extending around the support, and followers for said cam connected to the respective members at points angularly located according to the angular spacing of said cutters, said cam operating to shift said cutters in timed relation to the rotation of the support whereby to shape the taper formed by the cutters to a polygonal shape.

9. A machine for operating upon one end of a metal bar having, in combination, means for supporting said bar to present one end for machining, a drum rotatable about an axis extending longitudinally of a supported bar, a member pivotally supported on said drum for movement of its free end toward and away from the drum axis, a power driven milling cutter rotatably mounted on said member and shaped to cut a tapered surface on said work piece, a stationary cam extending around the drum, and a follower for said cam carried by said drum, and a motion transmitting connection between said follower and said member including means for varying the effective length of the connection.

10. A machine for operating upon one end of a metal bar of polygonal cross section having, in combination, means for supporting said bar with the sides thereof in predetermined angular positions, a drum rotatable about an axis extending longitudinally of a supported bar, a member pivotally supported on said drum for movement of its free end toward and away from the drum axis, a power driven milling cutter rotatably mounted on said member and shaped to cut a tapered surface on one end of said work piece, power driven means for rotating the drum, a stationary cam extending around the drum, and a follower for said cam connected to said member, said cam operating to shift said cutter in timed relation to the rotation of the drum whereby to shape the taper formed by the cutter to a polygonal shape corresponding to the cross sectional shape of the work piece.

11. A tool head for a machine tool of the character described having, in combination, a rotatable drum, a rotary cutter mounted on said drum and also supported for bodily movement toward and away from the drum axis, a stationary cam encircling said drum, and a follower for said cam mounted on the drum for imparting bodily movement to said cutter.

12. A machine for operating upon the squared end of a metal bar having, in combination, a work support adapted to support a bar with one end exposed for machining, a tool support opposite said end, said supports being mounted for relative rotation about an axis extending longitudinally of said bar, cutter means on said tool support having an effective cutting edge disposed at an angle to said axis and operable during such relative axial and rotary movements to taper said end, and power actuated mechanism operable during such rotation to feed said supports toward each other in a direction longitudinally of said bar and progressively decrease the rate of such feed during engagement of said cutter means and said end through a plurality of revolutions of relative rotation therebetween.

13. A machine for preparing a vertically cast metal billet of polygonal cross section for rolling and wire drawing, said machine having, in combination, work and tool supports mounted for relative rotation and for relative reciprocation about the axis of rotation, means for clamping a billet on said work support to expose one end for machining with the billet axis substantially coincident with said rotational axis, a cutter on said tool support, and power actuated means for effecting relative rotation between said supports and correlated movement thereof toward each other to form a truncated pyramid on said end, bevel the edges of the pyramid, and machine the end surface of the pyramid.

14. A machine for operating upon the squared end of a metal bar having, in combination, a work support adapted to support a bar with one end exposed for machining, a tool support opposite said end, said supports being mounted for relative rotation about an axis extending longitudinally of said bar, power actuated mechanism operable during such rotation to feed said supports toward each other in a direction longitudinally of said bar and then cause a pause in such movement while the supports continue to rotate, and cutter means on said tool support having an effective cutting edge disposed at an angle to said axis and operating during such feeding movement and in a plurality of revolutions of relative rotation to remove a multiple spiral layer of metal from said end whereby to taper the same, said cutter means operating during said pause to reduce said taper to a surface symmetrical with respect to said axis.

15. A tool head for a machine tool of the character described having, in combination, a rotatable cutter support, a rotary cutter mounted on said support and also supported for bodily movement toward and away from the support axis about a pivot extending diametrically thereof, means for transmitting driving power for rotating said cutter including a shaft mounted on said support to turn about said pivotal axis, a stationary driving motor, and means for transmitting power from the motor to said shaft including a shaft disposed on the axis of said support.

16. A tool head for a machine tool of the character described having, in combination, a rotatable tool support, a rotary cutter mounted on said support and also supported for bodily movement toward and away from the support axis about a pivot on the support, and means for transmitting driving power for rotating said cutter including a shaft mounted on said support to turn about the axis of said pivot.

17. In a machine for fashioning a pyramidal end on an elongated metal work piece, the combination of a clamping mechanism for holding the work piece in position for machining, a rotatable milling cutter having its active face disposed at an angle with respect to the axis of the work piece, means for effecting bodily rotary movement of the cutter with respect to the axis of the work piece and simultaneous movement axially thereof, and means for oscillating said cutter toward and away from the axis of the work piece about a center of oscillation lying substantially on such axis and in timed relation to said bodily rotary movement.

18. A machine for preparing a metal billet of polygonal cross section for rolling and wire drawing, said machine having, in combination, a member for supporting a billet with one end overhanging the member, a tool supporting member, power actuated mechanism for relatively rotating said members about the longitudinal axis of said billet and for relatively reciprocating the members along said axis, a cutter operating during a plurality of revolutions of such rotation combined with axial movement of said members toward each other to remove a succession of metal layers from said end and form a taper thereon, said cutter being mounted for movement toward and away from said axis, and means operating in timed relation to said rotary movement to oscillate said cutter bodily relative to its supporting member about a center of oscillation lying on the axis of rotation of said members so that said cutter forms said taper into a pyramidal shape with beveled corners and with side surfaces constituting planar extensions of the side surfaces of the billet.

19. A machine tool for operating on the end of a metal bar having, in combination, a support for the bar, a tool support, said supports being mounted for relative rotation about the axis of a bar supported on the work support and also for relative movement longitudinally of said axis, and a cutter of generally hour-glass shape mounted on said tool support to turn about an axis intersecting and extending transversely of the axis of said bar, said cutter operating during relative rotational and axial movements between said supports to machine a convexly curved surface on the end of said bar.

20. A machine tool for operating on the end of a metal bar having, in combination, a support for the bar, a tool support, said supports being mounted for relative rotation about the axis of a bar supported on the work support and also for relative movement longitudinally of said axis, and a power rotated cutter mounted on said tool support to turn about an axis intersecting and extending transversely of the axis of said bar, said cutter operating during relative rotational and axial movements between said supports to mill the end surface of said bar.

21. The method of tapering one end of a billet of polygonal cross section to prepare the same for rolling or wire drawing which comprises supporting the billet for engagement with a cutter having an edge inclined with respect to the axis of the billet at an angle corresponding to the taper to be formed thereon, relatively rotating said billet and said cutter about the longitudinal axis of the billet and simultaneously moving the billet and said cutter longitudinally of said axis whereby to continuously remove metal from said end along a cutting line progressing toward the billet axis, finally interrupting said axial movement while continuing said rotary movement whereby to fashion the tapered end to a symmetrical contour, and in the course of such rotary movements moving said cutter toward and away from the axis of said billet in timed relation to the rotary movement whereby to reduce the tapered end to a truncated pyramidal contour.

22. The method of tapering one end of a metal bar of polygonal cross section which comprises supporting the bar for engagement with a cutter having an edge inclined with respect to the axis of the bar at an angle corresponding to the taper to be formed thereon, moving said cutter progressively about said axis and simultaneously along the axis, and in the course of such movements moving the cutter toward and away from said axis to fashion a tapered pyramidal end on the bar with the sides of the pyramid constituting planar continuations of the side faces of said bar.

23. The method of tapering one end of a metal bar of polygonal cross section which comprises supporting the billet for engagement with a cutting surface inclined relative to the axis of the bar at an angle corresponding to the taper to be formed thereon, relatively rotating said bar and said cutting surface about the longitudinal axis of the bar and simultaneously moving the bar and said cutter longitudinally of said axis whereby to remove metal from said end along a continuous cutting line progressing toward the bar axis, and finally interrupting said axial movement while continuing said rotary movement whereby to fashion the tapered end to a symmetrical contour.

24. The method of tapering one end of a billet of polygonal cross section to prepare the same for rolling or wire drawing which comprises supporting the billet for engagement with a cutting surface inclined with respect to the axis of the billet at an angle corresponding to the taper to be formed thereon, relatively moving said billet and said cutting surface to advance the latter through a plurality of revolutions in a general helical path about the longitudinal axis of the billet whereby to continuously remove a spiral layer of metal from said end, and in the course of each of said revolutions moving said cutting surface toward and away from said axis whereby to fashion the tapered end to the shape of a truncated pyramid having beveled edges.

25. The method of preparing a metal billet for rolling or wire drawing which includes steps of continuously removing metal from said end in layers inclined relative to the axis of the billet and progressing spirally around said end through a plurality of revolutions and during each of said revolutions removing the layer of metal along a truncated pyramidal path.

26. The method of tapering a metal bar which includes the step of continuously removing metal from said end in a multiple spiral layer inclined relative to the axis of the bar and having successive convolutions of decreasing thicknesses.

27. The method of tapering a metal bar which comprises continuously removing a succession of spiral layers of metal from the end of said bar to reduce the same progressively to the form of a truncated pyramid with beveled edges, and during the removal of the final portion of the metal, removing a succession of transverse metal layers from the end of the pyramid.

28. The method of preparing a metal billet for rolling or wire drawing which comprises removing a continuous multiple turn spiral layer of metal from the end of said bar to form a truncated pyramid, and during the course of such metal removal but in the final portion thereof, shaping the end of the pyramid to a convexly curved contour.

29. A machine for performing metal removing operations on an end portion of elongated bars comprising, in combination, a bed having a horizontal guideway, a pair of fixed clamping jaws spaced apart longitudinally of said bed adjacent one end of said guideway, a movable jaw cooperating with said fixed jaws to releasably clamp a bar therein with the bar extending longitudinally of said guideway, a tool carriage slidably mounted on said way having a power actuated traversing mechanism, means including a rotatable milling cutter mounted on said carriage for machining the adjacent end portion of a bar clamped in said jaws, and means including a work carriage disposed for movement transversely of said guideway between said fixed jaws for shifting successive bars to and from said fixed jaws, to thereby locate the work pieces on the fixed jaws in position to be engaged by said cutter but without interference with the cutter by said work carriage.

30. A machine tool organization having, in combination, a tool head, means for supporting a work piece in position for machining by a tool on said head, power driven mechanism for presenting work pieces successively to said supporting means, power driven mechanism for clamping a work piece on said supporting means, power driven mechanism for actuating said head, means controlling said mechanisms to effect operation thereof in an automatic cycle during which a work piece is moved to working position, is clamped thereon, said head is advanced and returned, and the work piece is moved away from said position, a manually operable control device adapted when actuated to interrupt the automatic cycle and effect immediate automatic retraction of said head away from the work piece, a plurality of normally inactive control devices each rendered operative in response to actuation of said first mentioned control device and operable selectively to control said transfer and clamping mechanisms.

31. A machine tool organization having, in combination, a power reciprocated tool head, means for supporting a work piece in position for machining by a tool on said head, power actuated mechanism for presenting work pieces successively to said supporting means, power actuated mechanism for clamping a work piece on said supporting means, means automatically controlling said mechanisms to effect operation thereof in an automatic cycle during which a work piece is moved to working position, is clamped thereon, said head is advanced and returned and the work pice is moved away from said position, a manually operable emergency control device adapted when actuated during said cycle to effect immediate automatic retraction of the head away from the work while maintaining continued activation of said clamping mechanism.

32. A machine tool organization having, in combination, a tool head, means for supporting a work piece in position for machining by a tool on said head, power actuated head-advancing and returning mechanism, power actuated work transferring mechanism, and power actuated clamping mechanism, means adapted when started to cause sequential operation of said mechanisms in an automatic cycle, a manually operable device for individually controlling the operation of one of said mechanisms and normally maintained in disabled condition, and a second manually operable device adapted when actuated to interrupt said automatic cycle and render said first mentioned device operable for controlling its associated mechanism.

33. In a machine tool organization, the combination of power actuated work-transferring, work-clamping, tool feeding and returning mechanisms, a plurality of magnetic relays respectively controlling the operations of said mechanisms, means controlling the selective energization of said relays to cause sequential operation of said mechanisms in an automatic cycle, a plurality of manually operable control devices by which the individual operations of certain of said mechanisms may be controlled, manually controllable means normally acting to maintain said devices disabled against effective operation and adapted when actuated during said cycle to interrupt the operation of said mechanisms and render said automatic control means ineffectual and to place said relays within the control of the respective devices.

34. A machine tool comprising, in combination, a plurality of relatively movable elements including a work support and a tool support, power actuating means for effecting relative movements between different ones of said machine tool elements, a manually operable cycle initiation control member, means responsive to an actuation of said control member for rendering said power actuating means operative to move said elements through a cycle consisting of a predetermined sequence of selected movements of the elements, and means operable at will including a plurality of individual manually operable control members for rendering said power means operative to effect predetermined movements of selected ones of said elements corresponding to individual steps in said cycle.

35. A machine tool for operating on the end of a metal bar having, in combination, a support for the bar, a tool support, said supports being mounted for relative rotation about the axis of a bar supported on the work support, a power rotated cutter journaled for rotation on said tool support having its active face inclined at an acute angle to the axis of the bar and extending toward an end of the bar, and means for moving said supports relative to each other to feed said cutter transversely of the bar axis in successive rectilinear paths angularly disposed with respect to each other to shape the bar end in pyramidal form.

36. A machine tool for operating on the end of a metal bar having, in combination, a support for the bar, a tool support, said supports being mounted for relative rotation about the axis of a bar supported on the work support, a power rotated cutter journaled for rotation on said tool support having its active face inclined at an acute angle to the axis of the bar and extending toward an end of the bar, means for moving said supports relative to each other to feed said cutter transversely of the bar axis in successive rectilinear paths angularly disposed with respect to each other to shape the bar end in truncated pyramidal form, and means including a second power rotated cutter for smoothing the end face of the bar.

37. The method of tapering a metal bar which includes supporting the bar for engagement with a cutting surface inclined with respect to the axis of the bar at an angle corresponding to the taper to be formed thereon, relatively moving said bar and cutting surface to advance the latter through a plurality of revolutions about the longitudinal axis of the bar, and in the course of said revolving movement feeding the bar and cutting surface toward each other axially of the bar at a progressively decreasing feed rate whereby to cause the cutting surface to remove from the bar a spiral layer of metal decreasing in thickness in successive convolutions.

38. A machine for preparing a metal billet of polygonal cross section for rolling and wire drawing, said machine having, in combination, work and tool supports mounted for relative rotation and for relative reciprocation along the axis of rotation, means for clamping a billet on said work support with one end exposed for machining and with the billet axis substantially coincident with the rotational axis, a cutter revolubly mounted on said tool support and located to one side of the billet axis with its axis of revolution inclined toward the billet axis at an angle corresponding to a taper to be formed on the exposed billet and for removing successive layers of metal from the latter to form a truncated pyramid thereon, and a second cutter mounted on said tool support to turn about an axis extending transversely of the axis of the first mentioned cutter and operable to perform a metal removing operation on the end of said pyramid.

39. A machine of the character described having, in combination, work and tool supports mounted for relative rotation and for relative feeding movement along the axis of rotation, means for clamping a work piece on the work support with one end exposed for machining and substantially coincident with said axis, rotary cutter means on said tool support operable during said feeding movement to remove a spiral layer of metal from said end whereby to machine a taper on the latter, and rotary cutter means operable during said feeding movement but after removal of the major portion of said layer to machine the end surface of said tapered end.

MARION L. STRAWN.
ALEXANDER OBERHOFFKEN.